(12) United States Patent
Yumiki

(10) Patent No.: US 8,068,160 B2
(45) Date of Patent: Nov. 29, 2011

(54) IMAGING APPARATUS, PRINTING APPARATUS, PRINTING SYSTEM, PRINTING METHOD, DISPLAY SYSTEM, DISPLAY APPARATUS, AND DISPLAY METHOD

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 12/279,971

(22) PCT Filed: Feb. 19, 2007

(86) PCT No.: PCT/JP2007/052931
§ 371 (c)(1),
(2), (4) Date: Sep. 17, 2008

(87) PCT Pub. No.: WO2007/097271
PCT Pub. Date: Aug. 30, 2007

(65) Prior Publication Data
US 2010/0225771 A1    Sep. 9, 2010

(30) Foreign Application Priority Data

Feb. 20, 2006   (JP) .................. 2006-043002

(51) Int. Cl.
H04N 5/222  (2006.01)
H04N 5/76   (2006.01)
H04N 5/228  (2006.01)
(52) U.S. Cl. ............ 348/333.02; 348/231.3; 348/208.11
(58) Field of Classification Search ............. 348/333.02, 348/231.3, 208.11, 207.2
See application file for complete search history.

(56) References Cited

U.S. PATENT DOCUMENTS

| | | | | |
|---|---|---|---|---|
| 7,532,245 | B2* | 5/2009 | Suzuki | 348/333.02 |
| 7,555,140 | B2* | 6/2009 | Nakami | 382/103 |
| 7,715,597 | B2* | 5/2010 | Costache et al. | 382/118 |
| 2001/0022624 | A1* | 9/2001 | Tanaka et al. | 348/333.02 |
| 2004/0234153 | A1* | 11/2004 | Nakami | 382/254 |
| 2006/0028576 | A1* | 2/2006 | Ito | 348/345 |
| 2009/0147107 | A1* | 6/2009 | Kawahara et al. | 348/240.2 |

FOREIGN PATENT DOCUMENTS

| | | |
|---|---|---|
| JP | 10-107981 | 4/1998 |
| JP | 2000-196933 | 7/2000 |
| JP | 2000-235580 | 8/2000 |
| JP | 2001-061089 | 3/2001 |
| JP | 2001-136424 | 5/2001 |
| JP | 2001-174900 | 6/2001 |
| JP | 2001-309225 | 11/2001 |
| JP | 2002-262155 | 9/2002 |
| JP | 2003-111009 | 4/2003 |
| JP | 2003-237170 | 8/2003 |
| JP | 2003-259296 | 9/2003 |
| JP | 2005-94423 | 4/2005 |

OTHER PUBLICATIONS

International Search Report for PCT/JP2007/052931; May 15, 2007.

* cited by examiner

*Primary Examiner* — James Hannett
(74) *Attorney, Agent, or Firm* — Pearne & Gordon LLP

(57) ABSTRACT

Provided is an imaging device capable of appropriately displaying or printing a combined image including a print image and a captured image. The device includes: an imaging sensor for receiving an optical image of a photographing object and converting the optical image into an electric image signal; a focus position detection unit for detecting a focus position for the object; and a control unit for recording the image signal while correlating it with focus position information.

28 Claims, 22 Drawing Sheets

| CAMERA POSTURE | POSTURE DISCRIMIATING SIGNAL |
|---|---|
| 0 degree (HORIZONTAL PHOTOGRAPHING) | 0 |
| 90 degrees (VERTICAL PHOTOGRAPHING) | 1 |

IMAGING APPARATUS, PRINTING APPARATUS, PRINTING SYSTEM, PRINTING METHOD, DISPLAY SYSTEM, DISPLAY APPARATUS, AND DISPLAY METHOD

TECHNICAL FIELD

The present invention relates to a method of printing out a photographed image. More particularly, the present invention relates to an imaging apparatus, printing apparatus, printing system and printing method for controlling the printing process of photographed images.

BACKGROUND ART

With the advancement of CCD (Charge Coupled Device) and CMOS (Complementary Metal-Oxide Semiconductor) technologies, signal processing performance of imaging sensors are improving in recent years. Furthermore, since imaging sensors can be provided at low prices, digital still cameras and digital video cameras (hereinafter simply referred to as "digital cameras"), which can convert an optical image of a photographing object to an electrical image signal and output the image signal to a personal computer, are quickly becoming popular.

In order to print out an image photographed using a digital camera, the photographed image recorded in the digital camera generally needs to be imported in a personal computer first. The printing apparatus connected to the personal computer receives a printing command and prints out the photographed image on a sheet of paper.

However, the user needs to operate the personal computer, import and print out the photographed image. Users who are unfamiliar with personal computers naturally have difficulty printing out photographed images. Furthermore, carrying out printing operation requires that software for importing photographed images into the personal computer and software for outputting photographed images to the printing apparatus be installed in advance.

On the other hand, a printing apparatus that can be directly connected to a digital camera without a personal computer is proposed (Patent Document 1). By this means, the user does not have to operate the personal computer, thereby allowing users who are unfamiliar with personal computers to easily print photographed images. Furthermore, the printing apparatus described in Patent Document 1 records in advance templates of calendars and picture postcards and so on and can print out composite images by arranging photographed images in the templates.

On the other hand, a camera that records additional information regarding photographed data such as the date and time of photographing, shutter speed and aperture with the photographed image is proposed. For example, the camera described in Patent Document 2 can record information showing the place where an image is photographed, as additional information. That is, the camera described in Patent Document 2 is provided with a GPS (Global Positioning System) to identify the location on the earth through a radio wave from an artificial satellite and displays the location information obtained through the GPS with the photographed image.

Patent Document 1: Japanese Patent Application Laid-Open No. HEI10-107981
Patent Document 2: Japanese Patent Application Laid-Open No. 2000-196933

DISCLOSURE OF INVENTION

Problems to be Solved by the Invention

With the spread of digital cameras, there is a growing demand for printing out not only photographed images but also images attaching a large amount of character information to photographed images, in a simple and efficient fashion. However, the printing apparatus described in Patent Document 1 has a problem of poor convenience because the user needs to adjust the arrangement and positions of photographed images in accordance with the templates used.

Furthermore, the camera described in Patent Document 2 displays, with a photographed image, information about the location the image was photographed. However, the camera of Patent Document 2 arranges location information without taking into account the position of the photographing object in the photographing screen and may display a composite image in which the photographing object and location information overlap, resulting in a problem of poor viewability.

Furthermore, the conventional digital camera records photographed images in a uniform vertical direction regardless of the vertical direction of the digital camera when an image is photographed. FIG. 1 shows a relationship between the posture of a digital camera and a photographed image displayed on a display section. As shown in FIG. 1, the user photographs an image by changing the posture of digital camera 500 in accordance with the intention of photographing. When, for example, an image is photographed as a horizontally oriented image as shown in FIG. 1A, the user photographs an image by holding digital camera 500 in a horizontal posture. When the photographed image is viewed by holding digital camera 500 in the horizontally oriented posture, the vertical direction in the photographed image displayed on the display section matches with the vertical direction in the digital camera when an image is photographed.

On the other hand, as shown in FIG. 1B, to photograph an image as a vertically oriented image, the user takes a photograph by holding digital camera 500 in a vertically oriented posture. When the photographed image is viewed by holding digital camera 500 in a horizontally oriented posture as shown in FIG. 1C, the vertical direction in the photographed image displayed on the display section does not match with the vertical direction in the digital camera when an image is photographed and there is a problem of poor viewability. Hereinafter, the posture of digital camera 500 in which the stroke direction of the shutter button is parallel to the direction of gravitational force as shown in FIG. 1A, will be referred to as a "horizontal photographing posture." On the other hand, the posture of digital camera 500 in which the stroke direction in the shutter button is perpendicular to the direction of gravitational force as shown in FIG. 1B, will be referred to as a "vertical photographing posture." Furthermore, the image photographed in a horizontal photographing posture will be referred to as a "horizontally photographed image" and the image photographed in a vertical photographing posture will be referred to as a "vertical photographed image."

Furthermore, the camera described in Patent Document 2 that displays location information with a photographed image records the photographed image in a uniform vertical direction regardless of the vertical direction of the digital camera when the image was photographed. For this reason, cases occur where the character string showing location information is displayed in a different vertical direction from that of the photographed image. FIG. 2 is a display example of a composite image of a photographed image and location information of the camera, described in Patent Document 2. FIG. 2A is an example of display of when an image is photographed in a horizontal photographing posture, and FIG. 2B is an example of display of when an image is photographed in a vertical photographing posture. As shown in FIG. 2B, the camera described in Patent Document arranges character string 520 showing location information at a predetermined position on photographed image 510 and in a vertical direction. In this way, since the vertical direction in the photographed image does not match with the vertical direction of the character string, there is a problem of poor viewability for the user.

It is therefore an object of the present invention to provide an imaging apparatus, printing apparatus, printing system and printing method capable of comfortably displaying and printing out composite images including print characters and photographed images.

Means for Solving the Problem

The imaging apparatus of the present invention employs a configuration having an imaging sensor that receives an optical image of a photographing object and converts the optical image to an electrical image signal; an area detection section that detects a specific area on a photographing screen from the image signal; and a control section that records the image signal in association with location information of the detected specific area.

The imaging apparatus of the present invention employs a configuration having an imaging sensor that receives an optical image of a photographing object and converts the optical image to an electrical image signal; a focus position detection section that detects a focus position with respect to the photographing object on a photographing screen from the image signal; and a control section that records the image signal in association with focus position information showing the detected focus position.

The imaging apparatus of the present invention employs a configuration having: an imaging sensor that receives an optical image of a photographing object and converts the optical image to an electrical image signal; a face position detection section that detects a position of a face of the photographing object on a photographing screen from the image signal or detects the position of the face of the photographing object on the photographing screen from an image signal read from a recording section; and a control section that records the image signal in association with face position information showing the detected position of the face.

The printing system of the present invention is a printing system in which an imaging apparatus and a printing apparatus are connected mutually, the imaging apparatus comprising: an imaging sensor that receives an optical image of a photographing object and converts the optical image to an electrical image signal; a focus position detection section that detects a focus position with respect to the photographing object on a photographing screen from the image signal; a control section that records the image signal in association with focus position information showing the detected focus position; a print data generation section that arranges at least one of character information and an image in a position different from the focus position on the photographing screen and generates print data including a photographed image matching the image signal and the at least one of the character information and the image; and a print data output section that outputs the generated print data, wherein the printing apparatus comprises a printing section that receives the outputted print data to perform printing.

The printing apparatus of the present invention employs a configuration having: an acquisition section that acquires an image signal obtained by electrically converting an optical image of a photographing object and focus position information showing a focus position with respect to the photographing object on a photographing screen; a print data generation section that arranges at least one of character information and an image in a position different from the focus position on the photographing screen and generates print data including a photographed image matching the image signal and the at least one of the character information and the image; and a printing section that performs printing based on the generated print data.

The printing method of the present invention includes: an acquisition step of acquiring an image signal obtained by electrically converting an optical image of a photographing object and focus position information showing a focus position with respect to the photographing object on a photographing screen; a print data generation step of arranging at least one of character information and an image in a position different from the focus position on the photographing screen and generating print data including a photographed image matching the image signal and the at least one of the character information and the image; and a printing step of performing printing based on the generated print data.

Advantageous Effect of the Invention

According to the present invention, it is possible to comfortably display or print out a composite image including print characters and a photographed image.

BRIEF DESCRIPTION OF DRAWINGS

FIG. 7 shows a configuration of the digital camera according to Embodiment 1, where

FIG. 15 shows a posture of an image shake correction mechanism in Embodiment 2, where

FIG. 19 shows display examples of a photographed image of the digital camera according to Embodiment 2, where

FIG. 22 shows examples of a composite image printed out by the printing apparatus according to Embodiment 2, where

FIG. 24 shows an example of a composite image printed out by a printing apparatus according to Embodiment 3, where

BEST MODE FOR CARRYING OUT THE INVENTION

Embodiment 1

Figure 1A:
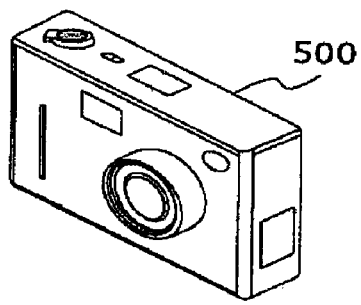
FIG. 1 shows a relationship between the posture and a photographed image displayed on a display section of a conventional digital camera.
Figure 1A:
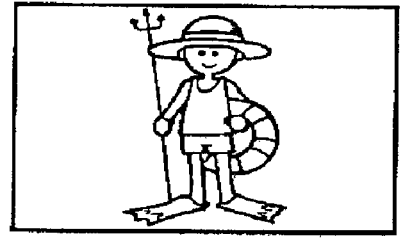
Figure 1B:
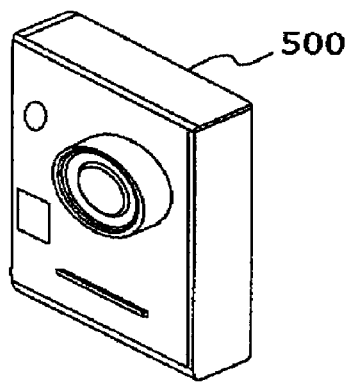
Figure 1B:
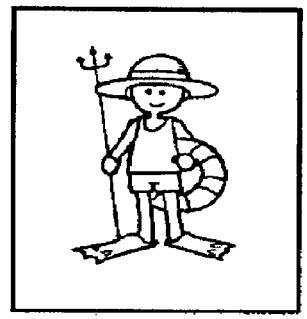
Figure 1C:
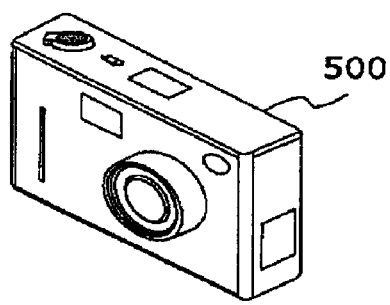
Figure 1C:
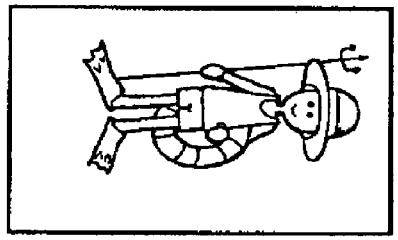
Figure 2A:
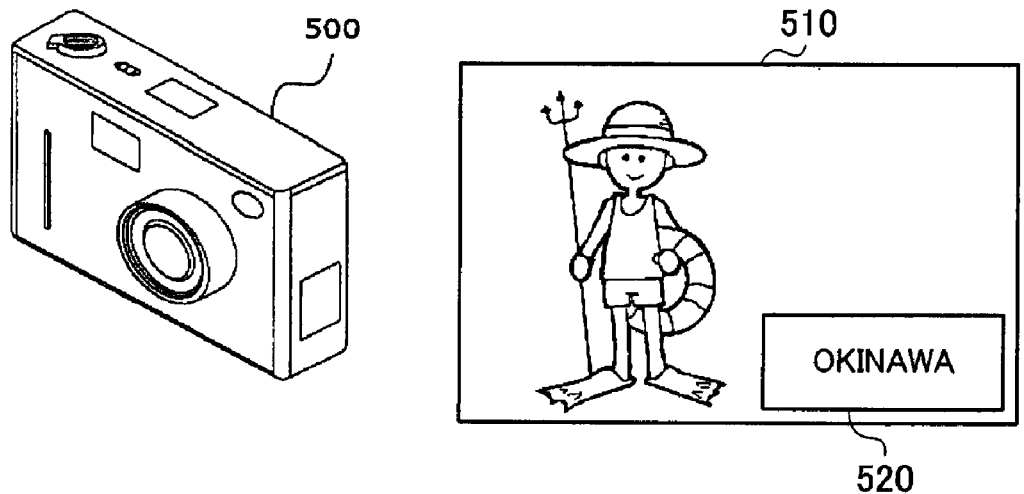
FIG. 2 shows a display example of a composite image of a photographed image and location information in a conventional camera.
Figure 2B:
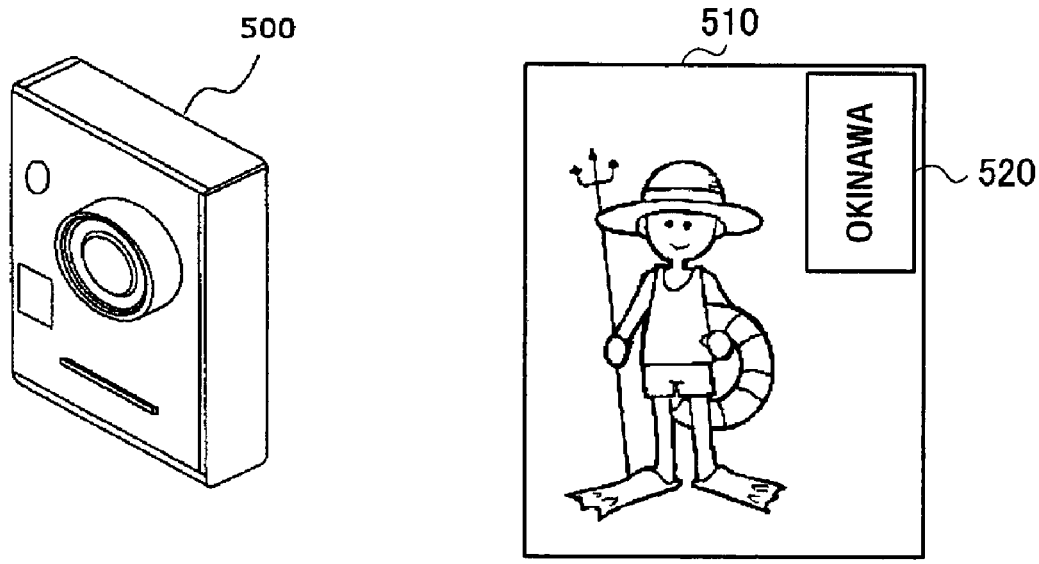
Figure 3:
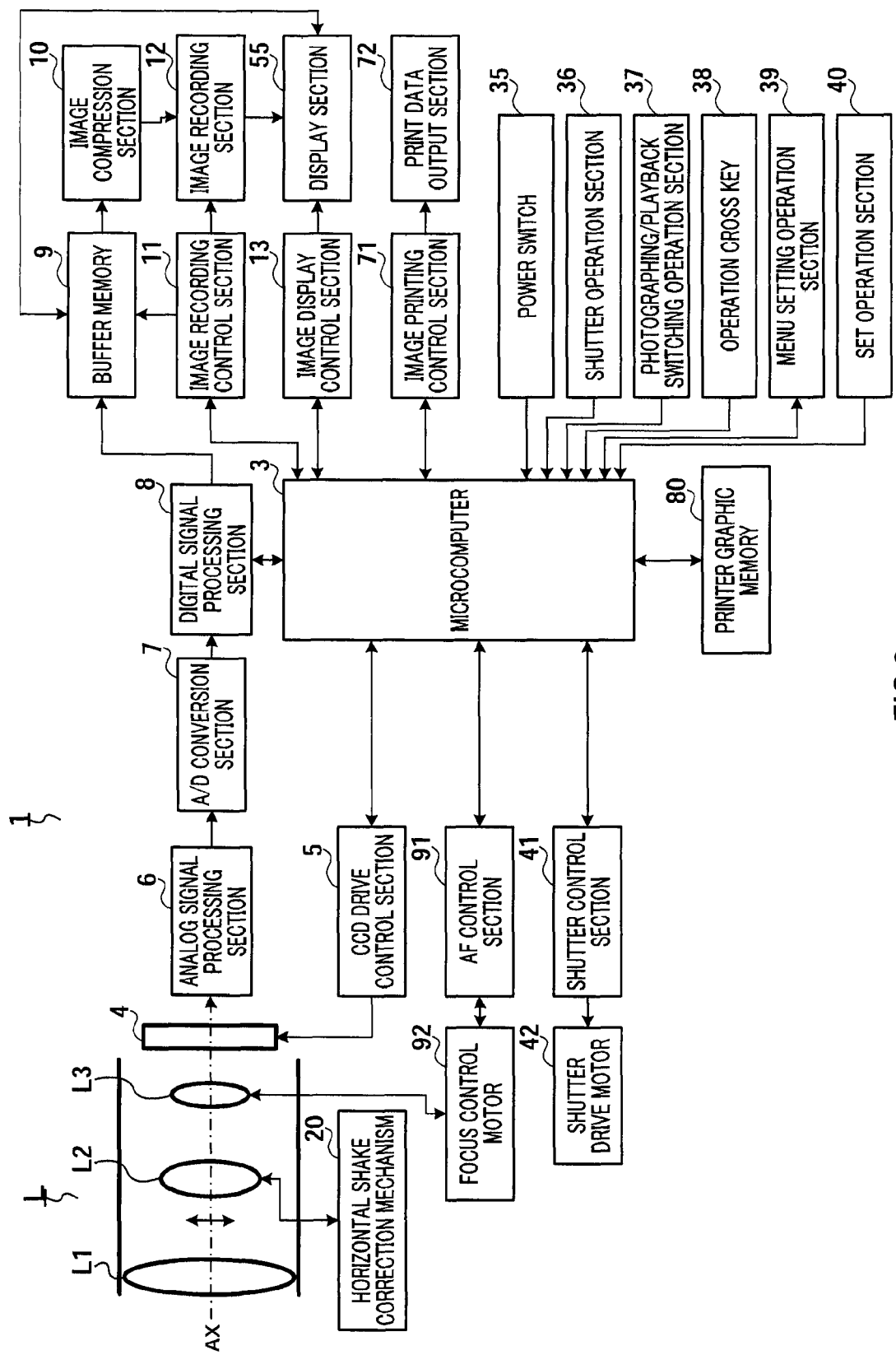
FIG. 3 is a block diagram showing a schematic configuration of a digital camera according to Embodiment 1.

FIG. 3 is a block diagram showing a schematic configuration of digital camera 1 according to Embodiment 1. Digital camera 1 is comprised primarily of imaging optical system. L, microcomputer 3, imaging sensor 4, CCD drive control section 5, analog signal processing section 6, A/D conversion section 7, digital signal processing section 8, buffer memory 9, image compression section 10, image recording control section 11, image recording section 12, image display control section 13, AF control section 91, display section 55, shutter control section 41, shutter drive motor 42, image printing control section 71, print data output section 72 and print character memory 80.

Imaging optical system L is an optical system including three lens groups L1, L2 and L3. First lens group L1 and second lens group L2 perform zooming by moving in directions along the optical axis. Second lens group L2 is a correction lens group that decentralizes the optical axis and corrects the motion of an image by moving in a plane perpendicular to the optical axis. Third lens group L3 performs focusing by moving in the directions along the optical axis. The imaging optical system L is not limited to the above-described optical system configuration.

When mechanical vibration or shake by the photographer is added to digital camera 1, a gap is created between the optical axis of light radiated from the photographing object toward the lens and the optical axis of the lens, and, as a consequence, a blurred image is created. Therefore, digital camera 1 has image shake correction mechanism 20 to prevent a blurred image from being created. The detailed configuration of image shake correction mechanism 20 will be described later.

Microcomputer 3 controls the whole of digital camera 1 and is able to receive signals from power switch 35, shutter operation section 36, photographing/playback switching operation section 37, operation cross key 38, MENU setting operation section 39 and SET operation section 40.

Shutter operation section 36 is, for example, a release button operated by the photographer upon taking a photograph. When shutter operation section 36 is operated, a timing signal is outputted to microcomputer 3. Shutter operation section 36 is a two-stage pushdown switch that allows a half-press operation and a full-press operation, starting focus adjustment when the user performs the half-press operation and outputting a timing signal when the user performs the full-press operation. Shutter control section 41 drives shutter drive motor 42 according to a control signal outputted from microcomputer 3 having received a timing signal and operates the shutter.

Imaging sensor 4 is, for example, a CCD, and converts an optical image formed in imaging optical system L to an electrical signal. Imaging sensor 4 is driven and controlled by CCD drive control section 5. Imaging sensor 4 may be a CMOS.

An image signal outputted from imaging sensor 4 is sent from analog signal processing section 6 to A/D conversion section 7, digital signal processing section 8, buffer memory 9 and image compression section 10, in order, and processed. Analog signal processing section applies analog signal processing such as gamma processing and so on to an image signal outputted from imaging sensor 4. A/D conversion section 7 converts the analog signal outputted from analog signal processing section 6 to a digital signal. Digital signal processing section 8 applies digital signal processing such as noise cancellation, contour emphasis and aspect ratio switching processing (described later) to the image signal converted into a digital signal in A/D conversion section 7. Buffer memory 9 is a RAM (Random Access Memory) that stores the image signal processed by digital signal processing section 8 on a temporary basis.

The image signal stored in buffer memory 9 is sent from image compression section 10 to image recording section 12 in sequence and processed. The image signal stored in buffer memory 9 is readout according to a command from image record control section 11 and transmitted to image compression section 10. The data of the image signal transmitted to image compression section 10 is compressed in a predetermined ratio and is therefore reduced to a smaller data size. For example, the JPEG (Joint Photographic Experts Group) scheme is used as the compression method. Furthermore, image compression section 10 generates a compressed image signal matching the photographed image used for a thumbnail display and so on. After that, the compressed image signal is sent to image recording section 12.

Image recording section 12 is, for example, an inner memory and/or is a detachable removable memory that records an image signal in association with an associated compressed image signal and predetermined information to be recorded, based on a command from image record control section 11. The predetermined information to be recorded with the image signal includes the date and time the image is photographed, focal length information, shutter speed information, F-number information and photographing mode information. The predetermined information is given, for example, in the Exif (registered trademark) format or in similar formats to the Exif format.

Image display control section 13 is controlled by a control signal from microcomputer 3. According to the control signal, image display control section 13 has display section 55 display an image signal recorded in image recording section 12 or buffer memory 9 in a visible image. Here, display section 55 may employ a display mode of displaying the image signal alone as a visible image or may employ a display mode of displaying the image signal and information about the time the image was photographed in visible images.

Figure 4:
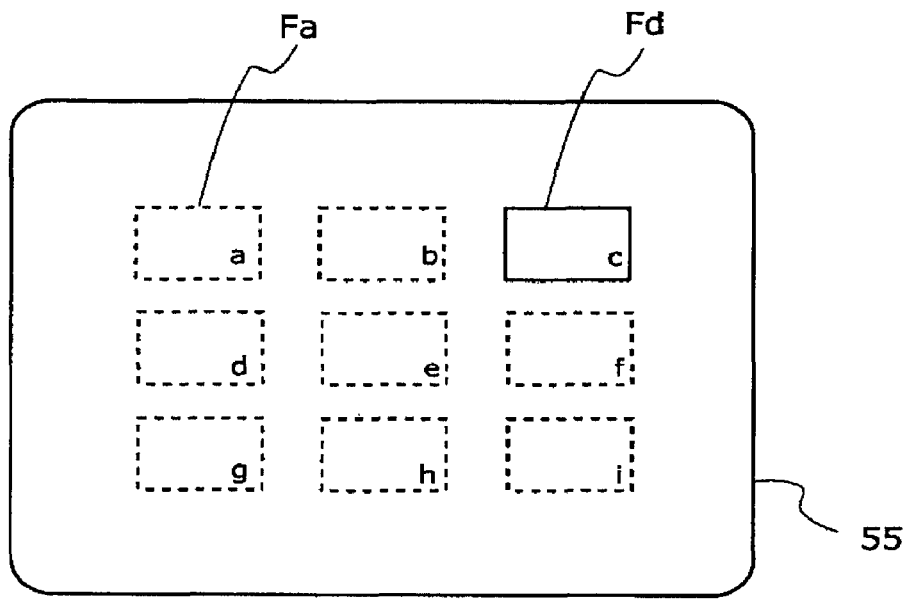
FIG. 4 shows an example of a distance measuring area set in the digital camera according to Embodiment 1.
Figure 14:
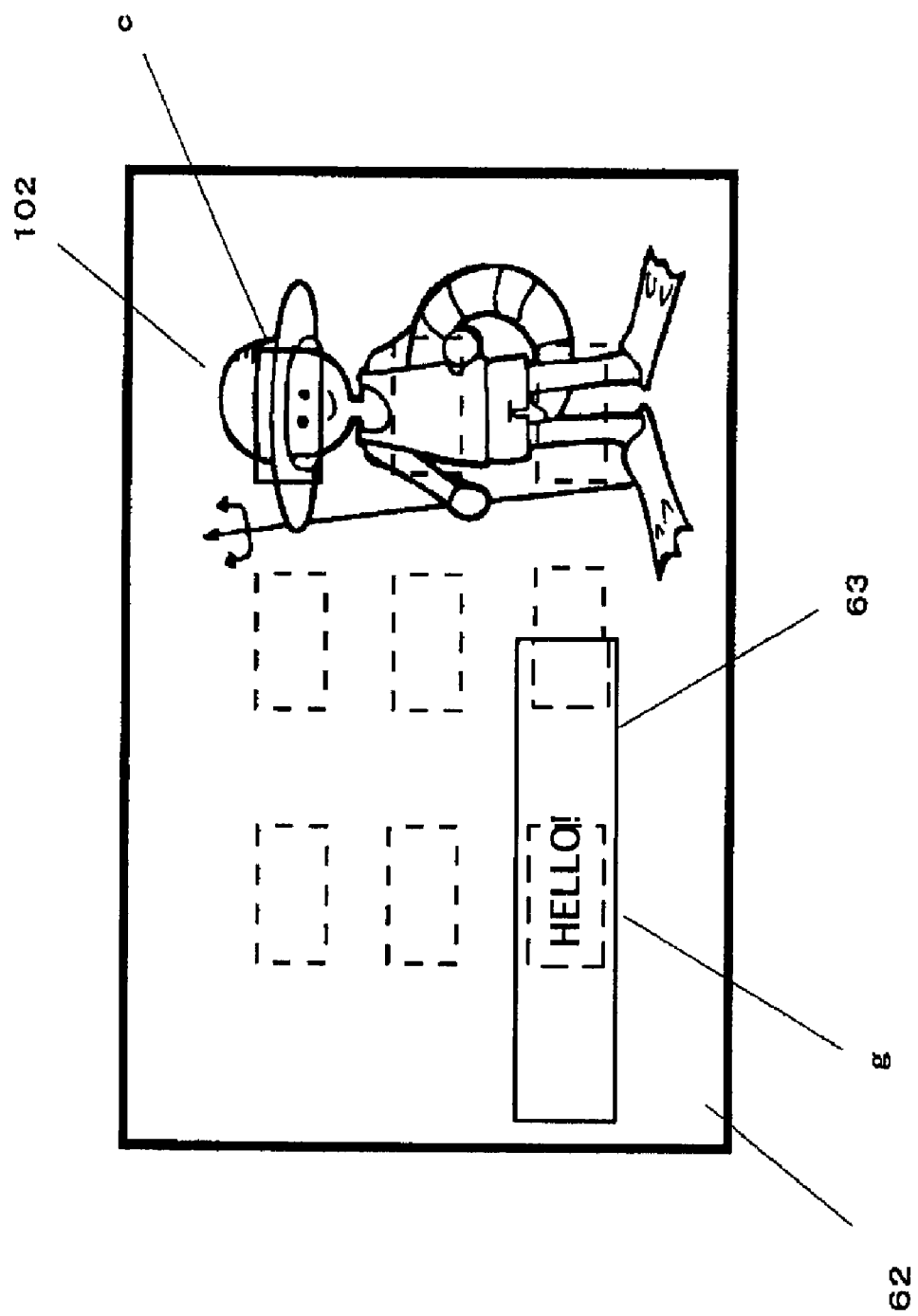
FIG. 14 shows an example of a composite image printed out by the printing apparatus in Embodiment 1.

AF control section 95 adjusts the focus by driving the third lens group L3 through focus drive motor 92 in the optical axis AX direction. Digital camera according to the present embodiment sets nine distance measuring areas Fa in advance from the standpoint of reducing the load of calculation processing. AF control section 91 detects the state of focus in each distance measuring area Fa and calculates an optimal focus position for the principal photographing object. FIG. 4 shows an example of distance measuring areas Fa set in digital camera 1, where a total of nine distance measuring areas Fa are set in predetermined positions on a photographing screen. The number of distance measuring areas shown in FIG. 4 is only an example and the number of distance measuring areas is not limited to this. For example, the calculation processing for adjusting the focus can be alleviated by reducing the number and areas of distance measuring areas. Furthermore, by increasing the number of distance measuring areas, a focus position can be detected more accurately. When a person is photographed, the focus position is usually the face, as shown in FIG. 14, FIG. 18 and FIG. 22.

Figure 5:
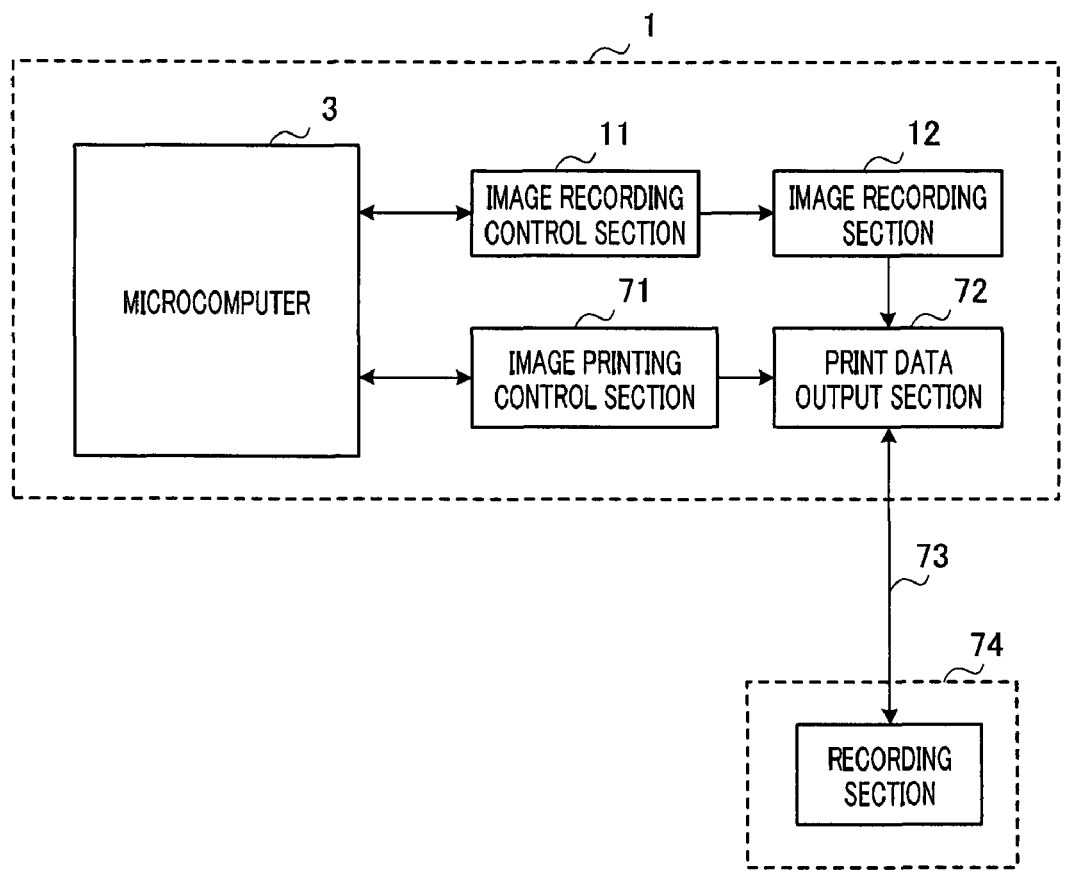
FIG. 5 shows an excerpt of only main parts of the control block diagram of the digital camera according to Embodiment 1.
Figure 6:
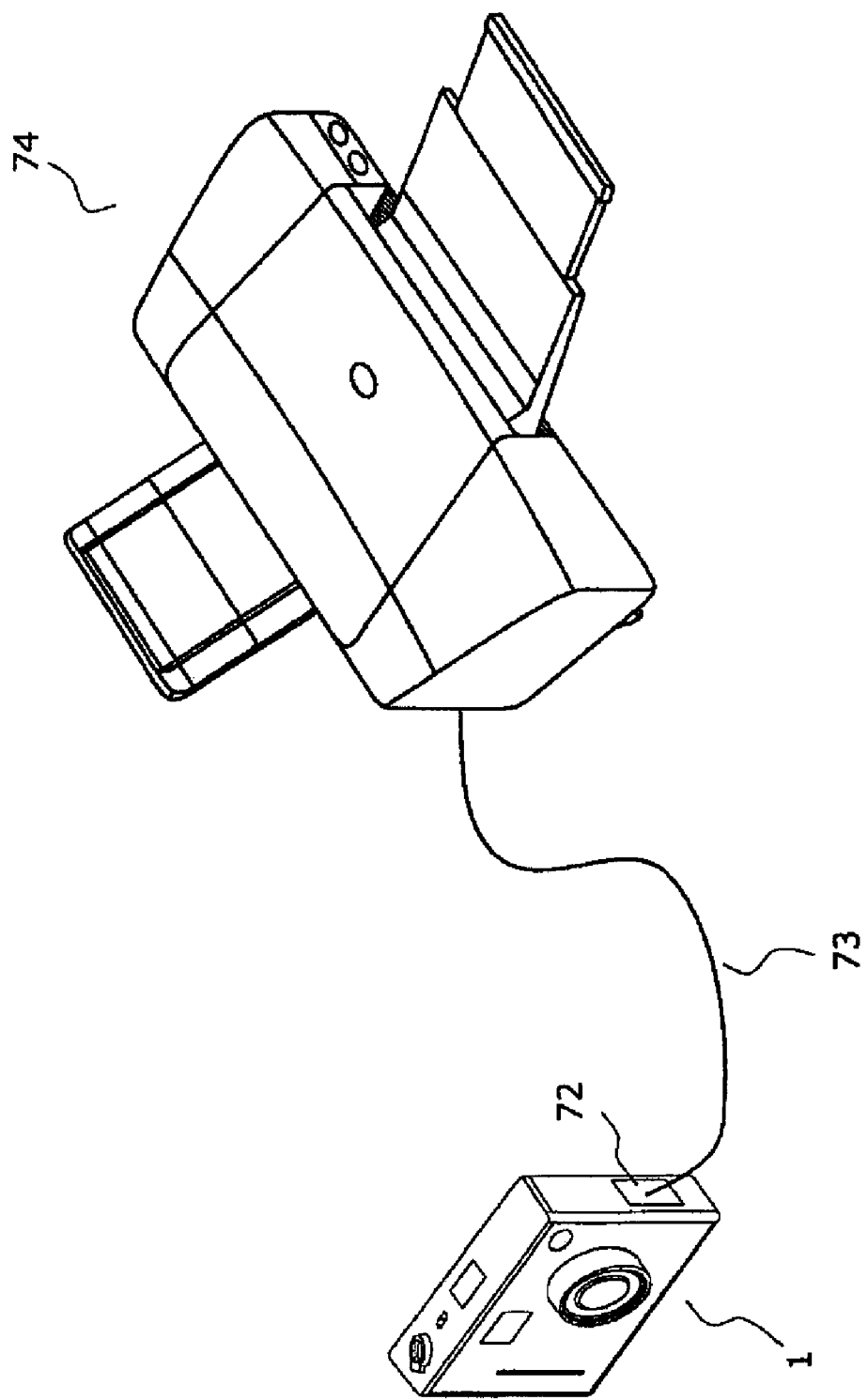
FIG. 6 is a schematic configuration diagram of the digital camera and a printing apparatus according to Embodiment 1.

FIG. 5 is an excerpt of only main parts of a control block diagram of digital camera 1 shown in FIG. 3. FIG. 6 is a schematic configuration diagram of digital camera 1 and printing apparatus 74. As shown in FIG. 6, digital camera 1 and printing apparatus 74 are connected using USB (Universal Serial Bus) cable 73. In FIG. 5, image printing control section 71 is controlled by a control signal from microcomputer 3 and generates print data to be sent to externally connected printing apparatus 74. Here, the print data includes, for example, a photographed image, character information to be printed out with the photographed image, and various types of data on printing such as arranged position and vertical direction of the character information, and the number of prints. Print data output section 72 outputs the print data to the recording section in printing apparatus 74 through USB cable 73 based on a command from image printing control section 71. Printing apparatus 74 prints a composite image of the photographed image and print characters on a sheet of paper based on the transferred print data and printing command.

Figure 7A:
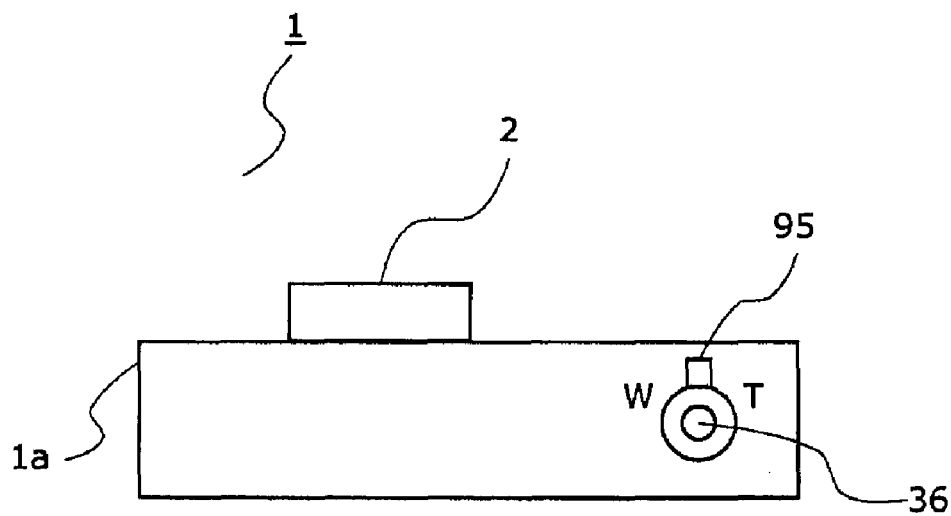
FIG. 7A shows a top view and FIG. 7B shows a rear view.
Figure 7B:
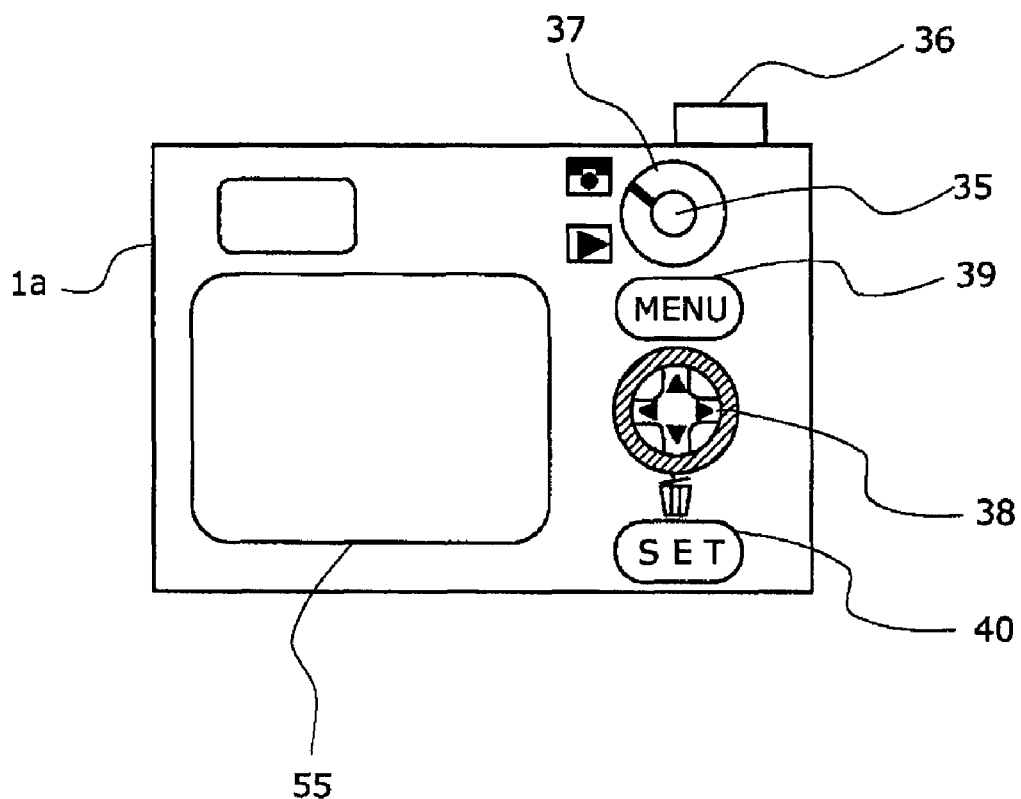

Next, the configuration of digital camera 1 according to Embodiment 1 will be explained using FIG. 7. FIG. 7A is a top view of digital camera 1 and FIG. 7B is a rear view of digital camera 1.

Casing 1a is provided with an imaging optical system including lens barrel 2 in the front and has power switch 35, photographing/playback switching operation section 37, operation cross key 38, MENU setting operation section 39, SET operation section 40 and display section made up of a liquid crystal monitor in the rear. Furthermore, the top surface of casing 1a is provided with shutter operation section 36 and zoom operation section 95.

Zoom operation section 95 is provided around shutter operation section 36 so as to be pivotal coaxially with shutter operation section 36. Power switch 35 is an operation unit for turning on and off power to digital camera 1. Photographing/playback switching operation section 37 is an operation unit for switching between photographing mode and playback mode and allows the photographer to switch between modes by turning a lever. If in photographing mode the photographer operates zoom operation section 95 clockwise, imaging optical system L switched to the telephoto side. On the other hand, when zoom operation section 95 is rotated counterclockwise, imaging optical system L is switched to the wide-angle side.

MENU setting operation section 39 is an operation unit for displaying various menus on display section 55. Operation cross key 38 is an operation unit where the photographer presses the upper, lower, left and right parts to select desired menu from various menu screens displayed on display section 55. When an operation menu is selected by operation cross key 38, microcomputer 3 issues an execution command matching the selected menu. SET operation section 40 is an operation unit to restore the display of operation menus to the state before the display.

Figure 8:
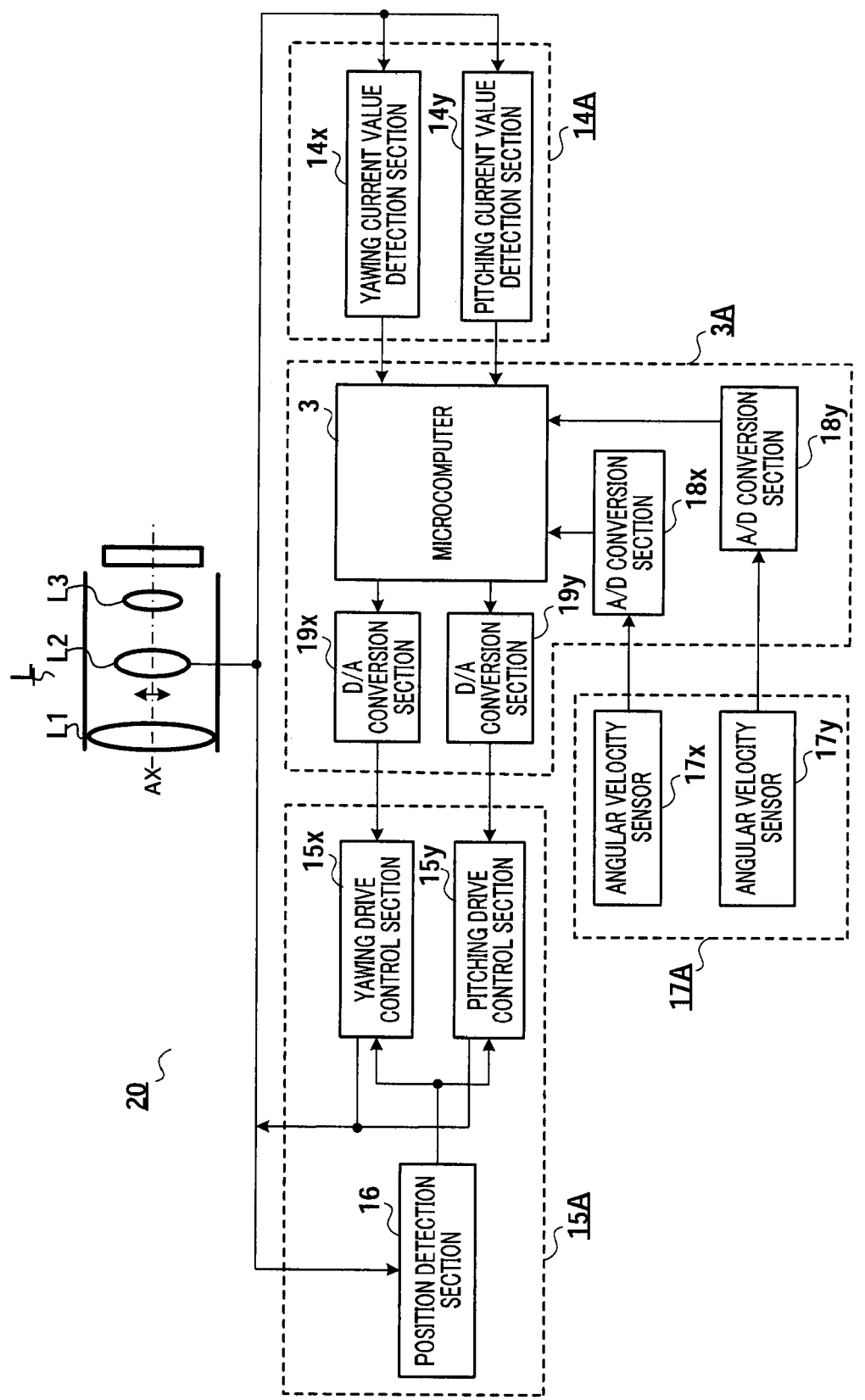
FIG. 8 illustrates a control system of an image shake correction mechanism according to Embodiment 1.

Next, the control system for the image shake correction mechanism will be explained using FIG. 8. In FIG. 8, image shake correction mechanism 20 is provided with motion correction section 15A, photographing posture detection section 14A, motion detection section 17A and signal processing section 3A. Motion correction section 15A includes second lens group L2, yawing drive control section 15x, pitching drive control section 15y and position detection section 16 and controls the optical axis of imaging light. Second lens group L2 is a correction lens group that decentralizes the optical axis AX and corrects the motion of an image by moving in the plane perpendicular to the optical axis AX. Second lens group L2 is driven and controlled by yawing drive control section 15x and pitching drive control section 15y in two directions orthogonal to optical axis AX, that is, X and Y directions. Hereinafter, the yawing direction is the X direction and the pitching direction is the Y direction. Position detection section 16 is a detection section for detecting the position of second lens group L2, and forms a feedback control loop to control second lens group L2 with yawing drive control section 15x and pitching drive control section 15y.

Photographing posture detection section 14A includes yawing current value detection section 14x and pitching current value detection section 14y. Yawing current value detection section 14x detects the current value flowing through a coil when yawing actuator 29x operates, which will be described later. Likewise, pitching current value detection section 14y detects the current value that flows through the coil when pitching actuator 29y operates.

Motion detection section 17A includes yawing angular velocity sensor 17x and pitching angular velocity sensor 17y. Angular velocity sensors 17x and 17y are sensors for detecting the motion of the imaging apparatus itself including imaging optical system L due to hand shake and other vibrations, and detect the motion in the two, yawing and pitching directions. Angular velocity sensors 17x and 17y output positive and negative angular velocity signals depending on the direction digital camera 1 moves, based on the output in a state where digital camera 1 is still. The outputted signals are processed in signal processing section 3A.

Signal processing section 3A includes microcomputer 3, A/D conversion sections 18x and 18y and D/A conversion sections 19x and 19y. Signals outputted from angular velocity sensors 17x and 17y are subjected to filtering processing and amplification processing and then converted into digital signals in A/D converters 18x and 18y, an the results are provided to microcomputer 3. Microcomputer 3 applies filtering, integration processing, phase compensation, gain adjustment and clipping processing to the output signals of angular velocity sensors 17x and 17y received via A/D converters 18x and 18y. By applying these types of processing, microcomputer 3 calculates the amount of drive control for correction lens group L2 which is necessary for motion correction, and generates a control signal. The control signal generated is outputted to yawing drive control section 15x and pitching drive control section 15y through D/A conversion sections 19x and 19y. In this way, yawing drive control section 15x and pitching drive control section 15y drive correction lens group L2 based on the control signal and correct the motion of the image.

Figure 9:
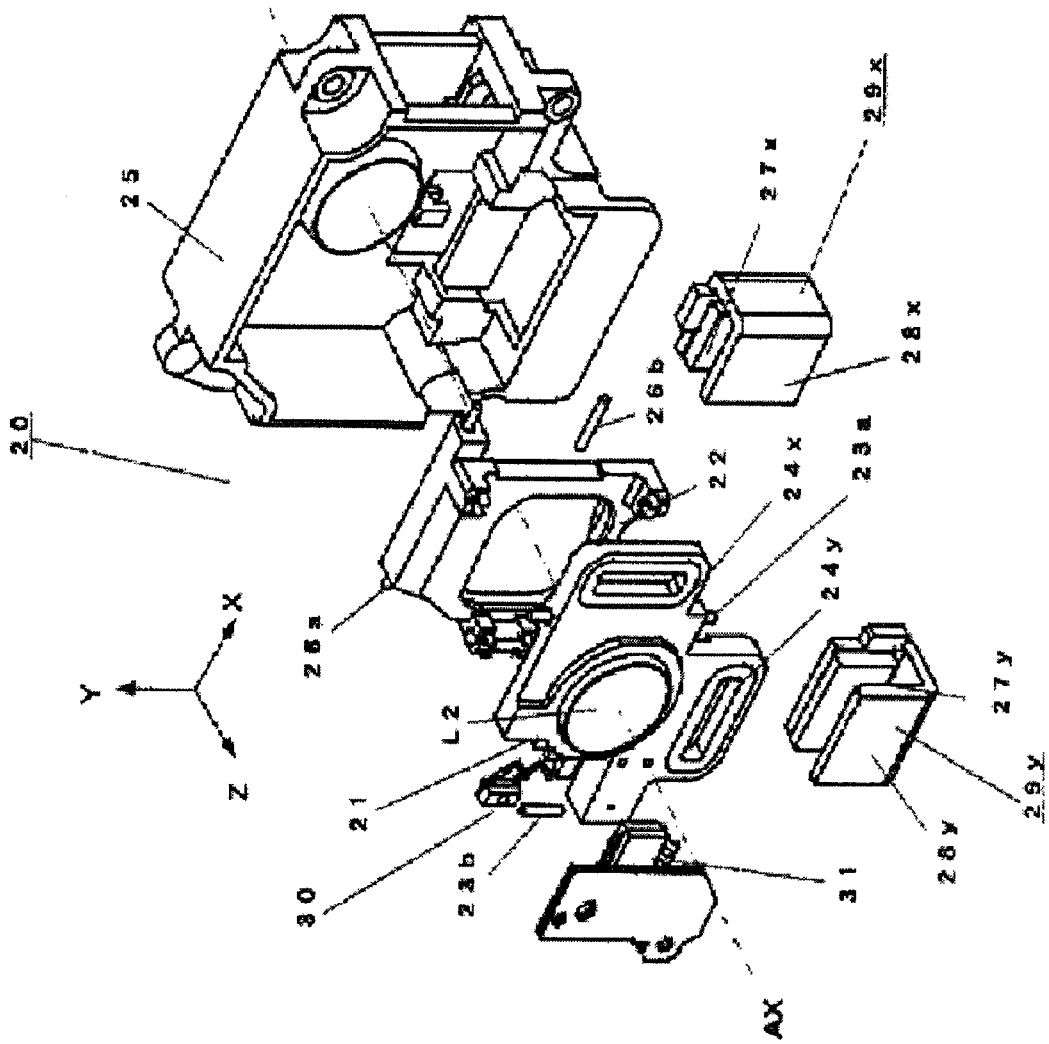
FIG. 9 shows a configuration of the image shake correction mechanism used in Embodiment 1.

The configuration of image shake correction mechanism 20 used in the present embodiment will be explained using FIG. 9. In FIG. 9, image shake correction mechanism 20 includes pitching holding frame 21, yawing holding frame 22, fixing frame 25, yawing actuator 29x, pitching actuator 29y, light emitting element 30 and light receiving element 31.

Pitching holding frame 21 has coils 24x and 24y. Second lens group L2 and light emitting element 31 are fixed to pitching move frame 21. Pitching move frame 21 is held to yawing move frame 22 to be slidable in the Y direction through two pitching shafts 23a and 23b.

Yawing move frame 22 is held to be slidable in the X direction to fixing frame 25 through yawing shafts 26a and 26b.

Yawing actuator 29x has magnet 27x and yoke 28x and is held to fixing frame 25. Likewise, pitching actuator 29y has magnet 27y and yoke 28y and is held to fixing frame 25.

Light receiving element 31 is fixed to fixing frame 25, receives light emitted from light emitting element 30 and detects a two-dimensional position coordinate.

Next, photographing processing by digital camera 1 will be explained. To start photographing an image, the user first operates power switch 35 on. Then, when photographing/playback switching operation section 37 is switched to photographing mode, digital cameral shifts to a photographing state. Having shifted to the photographing state, angular velocity sensors 17x and 17y start detecting hand shake or vibration added to digital camera 1. Microcomputer 3 gives a command signal for canceling hand shake and so on to yawing drive control section 15x and pitching drive control section 15y. A current matching this command signal is supplied to coils 24x and 24y of pitching holding frame 21. Pitching holding frame 21 moves within the plane of two directions X and Y orthogonal to optical axis AX with the supplied current and through a magnetic circuit formed of actuators 27x and 27y. Furthermore, the position of pitching holding frame 21 can be detected with high accuracy using light receiving element 31. That is, second lens group L2 moves in a plane orthogonal to the optical axis through image shake correction mechanism 20. Since image shake correction mechanism 20 controls the optical axis of light incident upon imaging sensor 4 in this way, it is possible to obtain a high-quality image with image shake suppressed.

Next, in the photographing mode, the user changes the posture and orientation of digital camera 1 while watching the image displayed on display section 55, and determines the composition with respect to the principal photographing object. When the user half-presses shutter operation section 36, the photometric operation for determining exposure and focus position calculation processing by AF control section 91 start. Here, many means are proposed for the method of placing the focus on the principal photographing object, and, for example, a method of determining the position where the contrast of the image is the greatest as the focus position, may be used. Hereinafter, the focus position calculation processing using the above described method will be explained.

First, focus control motor 92 operates third lens group L3 which is a focus lens in the optical axis direction and determines the position of third lens group L3 where the contrast value in each distance measuring area Fa becomes a maximum. The contrast value is obtained by calculating with microcomputer 3 the variations of light and shade from the image signal corresponding to each distance measuring area Fa. Next, AF control section 95 calculates an optimum focusing position for the principal photographing object from the magnitude of the contrast value in each distance measuring area Fa, weight based on the positions of distance measuring areas Fa in the photographing screen, and so on. Microcomputer 3 and AF control section 91 determine distance measuring area Fa closest to the calculated focus position as the focus area, and display this distance measuring area on display section 55 as focus area Fd. In the example shown in FIG. 4, focus area Fd is distance measuring area c shown by the solid frame line. The user can confirm the area on the photographing screen in which focus is achieved from displayed focus area Fd.

After focus area Fd is determined, if the user confirms that the desired principal photographing object is included in focus area frame Fd displayed on display section 55 and full-presses shutter operation section 36, shutter drive motor 42 opens and closes the shutter and the photographing object image is exposed in imaging sensor 4. The image signal converted by imaging sensor is subjected to the aforementioned predetermined processing and then recorded in image recording section 12. In this case, image recording control section 11 causes recording section 12 to record the focus position identifying signal (i.e. focus position information) showing the focus position with the photographed image. In the example shown in FIG. 4, since focus area Fd is distance measuring area c, a focus position identifying signal indicative of distance measuring area c, is recorded with the photographed image. The number of focus areas Fd is not limited to one but there may be a plurality of distance measuring areas. When the photographed image and focus position identifying signal are recorded as described above, a series of photographing processes is finished.

Figure 10:
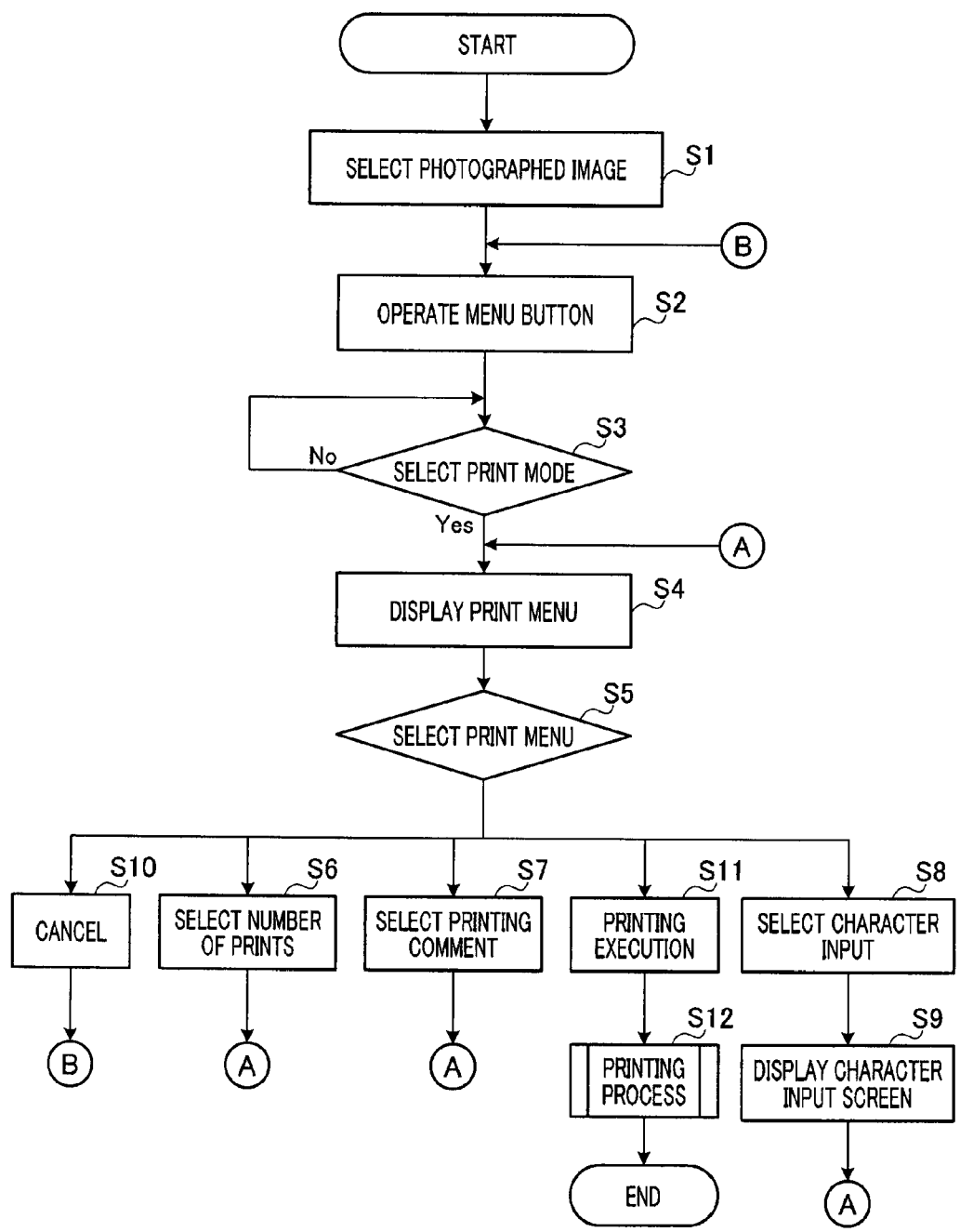
FIG. 10 is a flowchart of the process of printing out photographed images in Embodiment 1.
Figure 11:
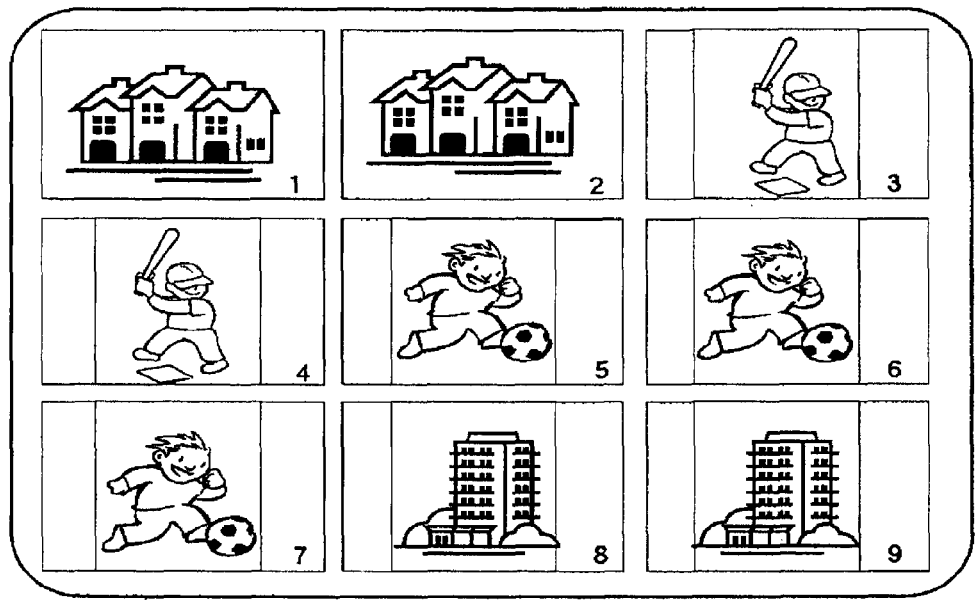
FIG. 11 shows thumbnail image display examples in Embodiment 1.

Next, the processing of printing out a photographed image and character information will be explained. FIG. 10 is a flowchart about a printing process. In FIG. 10, when the user switches photographing/playback switching operation section 37 to playback mode first and then selects a photographed image to be printed out, the process in digital camera 1 shifts to step 2. For example, as shown in FIG. 11, the user selects a photographed image from among thumbnail images displayed on display section 55 by operating operation cross key 38. In next step 2, when the user operates MENU setting operation section 39, a menu screen is displayed on display section 55. The menu screen is made up of a plurality of processing modes such as print mode and photographing mode and the user can select one mode. When the menu screen is displayed, the process moves to step 3. Next, in step 3, it is decided whether or not the print mode is selected from the menu screen. When the print mode is selected, the process of digital camera 1 moves to step 4. On the other hand, when the print mode is not selected, a menu screen or a menu about each processing mode is displayed on display section 55.

Figure 12:
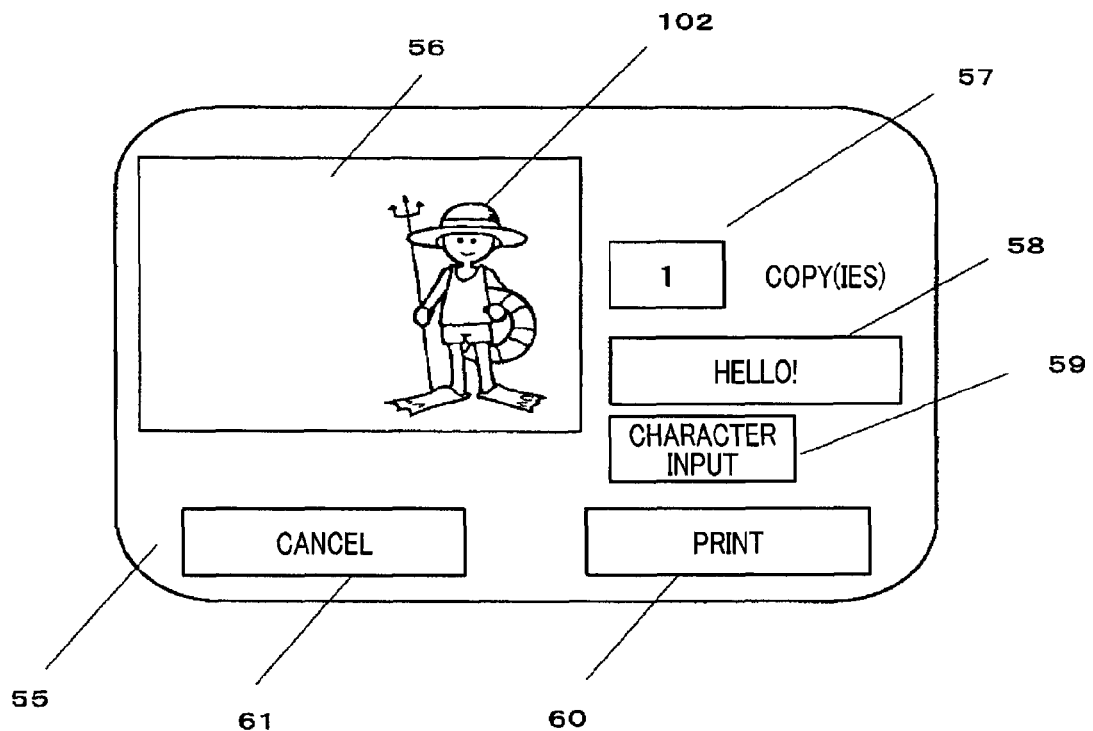
FIG. 12 shows an example of a print menu displayed on the display section in Embodiment 1.

Next, in step 4, a print menu is displayed on display section 55. FIG. 12 shows an example of the print menu displayed on display section 55. In FIG. 12, the print menu is made up of compressed image display section 56, print number selection pull-down menu 57, print character selection pull-down menu 58, character input screen selection icon 59, printing execution icon 60 and cancel icon 61 and the user can select each menu by operating operation cross key 38. The compressed image displayed on compressed image display section 56 is a compressed image of the image the user selected in step 1. In next step 5, microcomputer 3 accepts the user selection from the print menu. When one of the print menus is selected, digital camera 1 moves to the process for each print menu.

When print number selection pull-down menu 57 is selected from the print menu, a list of numbers of prints is displayed as a pull-down menu on part of the print menu screen. The user can select a desired number of prints by operating operation cross key 38 from the numbers of prints displayed in the list. When the number of prints is selected, the pull-down menu is closed and the selected number of prints is displayed on print number selection pull-down menu 57 (step 6).

When print character selection pull-down menu 58 is selected from the print menu, a list of several kinds of character string stored in advance in print character memory 80 is displayed as a pull-down menu on part of the print menu screen. Print character memory 80 is a read-only memory and stores a plurality of character strings such as "Hello!" and "How are you?" The user can select a character string to be printed out with the photographed image (hereinafter referred to as "print characters") from the list of character strings displayed. When print characters are selected, the pull-down menu is closed and the print characters are displayed on print character selection pull-down menu 58 (step 7). For example, in FIG. 12, the number of prints selected by the user is one and the print characters are "Hello!"

When character input screen selection icon 59 is selected from the print menu (step 8), a character input screen for accepting inputs of arbitrary characters from the user is displayed on display section 55 (step 9). When the input of characters is finished, the print menu is displayed again on display section 55.

When cancel icon 61 is selected from the print menu, the print mode is finished and the menu screen is displayed again on display section 55 (step 10). Furthermore, when printing execution icon 60 is selected from the print menu (step 11), microcomputer 3 sends a printing execution command to printing apparatus 74 and printing apparatus 74 executes the printing process (step 12).

Figure 13:
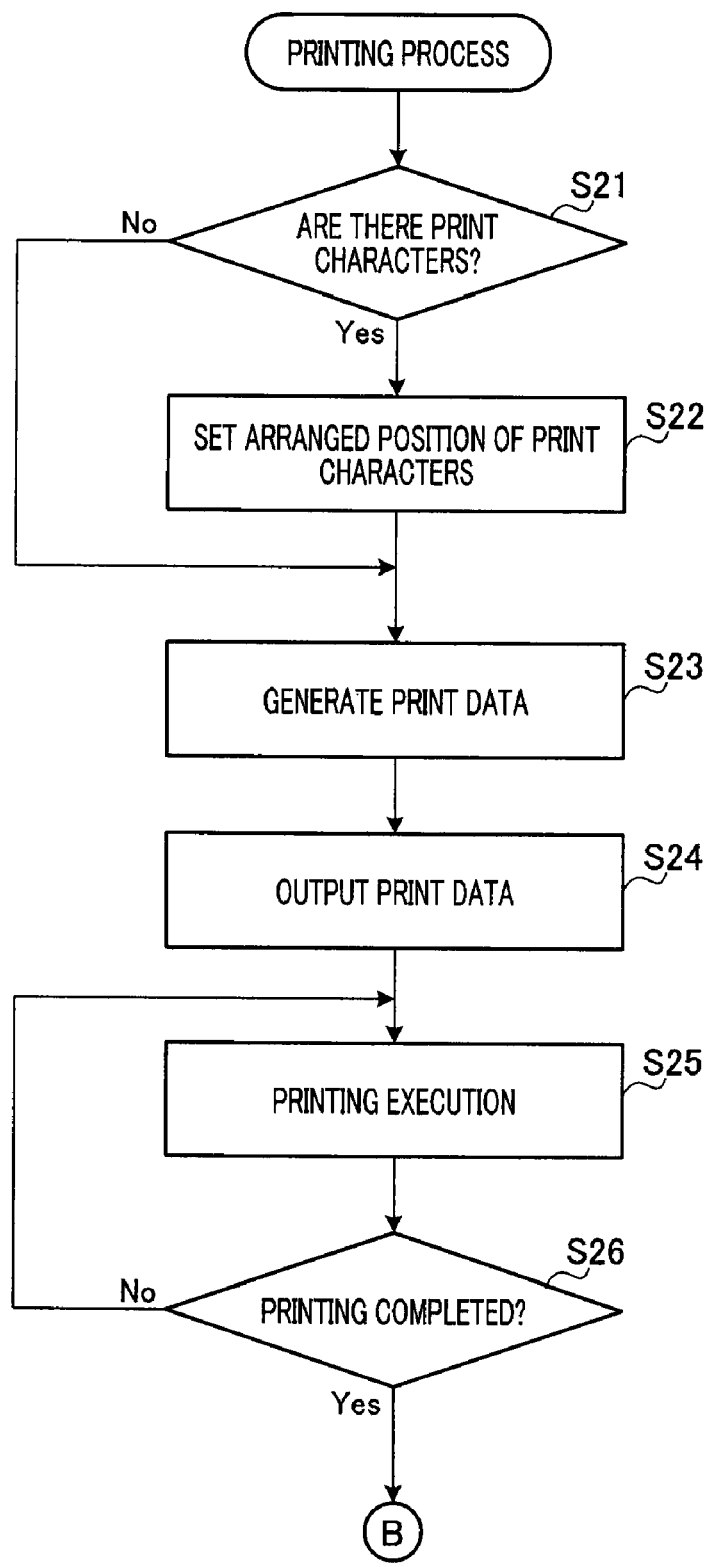
FIG. 13 is a flowchart of the printing process in Embodiment 1.

Next, details of the printing process will be explained. FIG. 13 is a flowchart showing the printing process in step 12. When printing execution icon 60 is selected, microcomputer 3 decides the presence or absence of an input or selection of print characters in the print menu in step 21 first. When print characters are going to be included, the process moves to step 22, and on the other hand, when no print characters are going to be included, the process moves to step 23.

In step 22, microcomputer 3 determines arranged position of print characters in the photographed image. Here, the positions for placing print characters are determined based on a focus position identifying signal and the print characters are arranged in a distance measuring area other than focus area Fd. For example, in FIG. 4, when the focus position identifying signal added to the image signal indicates distance measuring area c, focus area Fd is distance measuring area c, and therefore the print characters are arranged in an area that does not overlap with the photographing object image, for example, distance measuring area d. When the arranged position for the print characters are determined, data showing the arranged position is sent to image printing control section 71 and the process moves to step 23.

In step 23, image printing control section 71 generates print data including the photographed image, printer graphic, arranged position of print characters and the number of prints and so on. In next step 24, the print data is outputted to printing apparatus 74 by print data output section 72. Furthermore, in step 25, printing apparatus 74 prints out a composite image including the photographed image and print characters on a number of sheets of paper equaling the specified number of prints based on the received print data. Next, in step 26, microcomputer 3 decides whether or not printing of a predetermined number of prints is finished, and when the printing is finished, microcomputer 3 finishes the printing process and causes display section 55 to display the menu screen again.

FIG. 14 is an example of the composite image printed out by printing apparatus 74. FIG. 14 displays the respective distance measuring areas with the composite image for purposes of illustration, but the respective distance measuring areas are not actually displayed on the image to be printed out. In FIG. 14, the print characters are arranged in positions outside the focus area of the photographed image based on the focus position identifying signal and printed on sheet 62. Here, since the focus area is distance measuring area c, print characters 63 are arranged in distance measuring area g positioned on a diagonal line with respect to distance measuring area c. In this way, since print characters 63 are arranged in positions that do not overlap with object image 102, a composite image with good viewability can be printed. Furthermore, the user needs not adjust the arrangement of print characters, can easily and efficiently print out the composite image and a high level of convenience is thereby provided.

Furthermore, digital camera 1 according to the present embodiment can not print out a composite image with good viewability, and, furthermore, display the composite image on display section 55. Image display control section 13 arranges the print characters based on the focus position identifying signal and causes display section 55 to display the composite image. Therefore, the user needs not arrange the print characters so that the photographed image and the print characters do not overlap each other. Furthermore, it is possible to display a composite image to be printed out on a display section before starting printing and thereby prevent print failures. The composite image is not limited to the one displayed before printing execution but may also be displayed in or after printing execution.

As described above, the digital camera according to Embodiment 1 records information showing the focus position with the photographed image. Since print characters are arranged with the photographing object position taken into account, it is possible to print out a composite image with good viewability. Furthermore, since the user needs not adjust positions where print characters are arranged, the composite image can be easily and efficiently printed out and a high level of convenience is provided.

Furthermore, the digital camera according to Embodiment 1 arranges print characters by taking the photographing object position into account, and can thereby display the composite image with good viewability on the display section.

In the present embodiment, print characters to be printed out with the photographed image are selected or inputted by the user from a print menu in the printing process, but the present invention is not limited to this. For example, print characters to be printed out may also be stored in a header section or footer section of an image file including the photographed image. Alternatively, a document file in which a character string to be printed out is stored may also be managed in association with an image file.

Furthermore, when a plurality of photographing objects are photographed simultaneously, the focus position is not limited to only one location but there may be a plurality of focus positions. In this case, print characters or images are displayed or printed so as not to overlap the plurality of focus positions.

Furthermore, the distance measuring area and focus area need not always be displayed on display section 55. Furthermore, even when the distance measuring area and focus area are displayed on display section 55, the frames of the distance measuring area and focus area may be made not to be printed out during printing.

Embodiment 2

Next, digital camera 100 according to Embodiment 2 will be explained. Digital camera 100 according to the present embodiment has substantially the same configuration as that of digital camera 1 according to Embodiment 1, but is different in deciding the posture of the digital when an image is photographed. In the present embodiment, components similar to those of digital camera 1 are assigned the same reference numerals and explanations will focus upon differences from Embodiment 1.

Figure 15A:
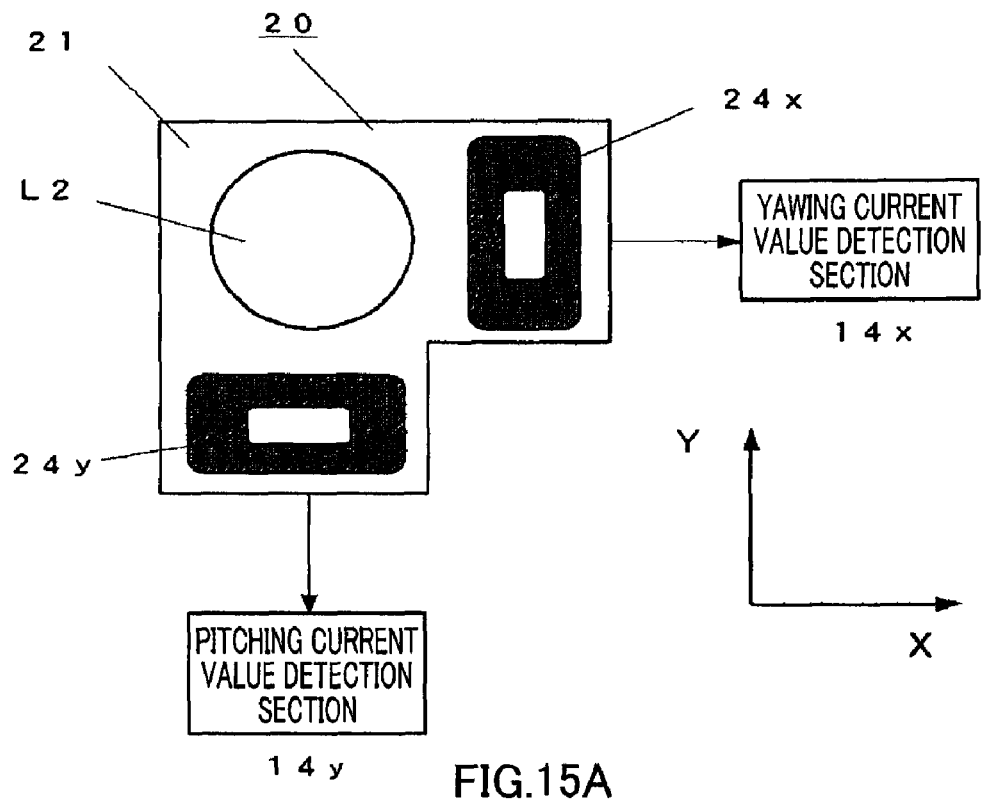
FIG. 15A shows a posture of the image shake correction mechanism when photographing an image in a horizontal photographing posture and FIG. 15B shows the image shake correction mechanism when photographing an image in a vertical photographing posture.

In the present embodiment, image shake correction mechanism 20 can be used not only to prevent image shake but also to function as a posture detection section of digital camera 100. FIG. 15 shows a posture of image shake correction mechanism 20; FIG. 15A showing the posture of image shake correction mechanism 20 for when photographing an image in a horizontal photographing posture and FIG. 15B showing the posture of image shake correction mechanism 20 for when photographing an image in a vertical photographing posture.

In the case of horizontal photographing posture in FIG. 15A, the respective weights of second lens group L2, pitching holding frame 21, coils 24x and 24y, and yawing holding frame 22 act in the Y direction which is the direction of gravitational force. In this case, second lens group L2 needs to be held at the center of the optical axis to obtain an appropriate image. This requires generation of an electromagnetic force to support the weight of second lens group L2. Therefore, current value Iy1 is supplied to coil 24y to generate the required electromagnetic force. On the other hand, regarding the X direction, to hold second lens group L2 at the center of the optical axis it is not necessary to take into account the weight of second lens group 2, and therefore current value Ix2 supplied to coil 24x is a smaller value than current value Iy1 supplied to coil 24y.

Figure 15B:
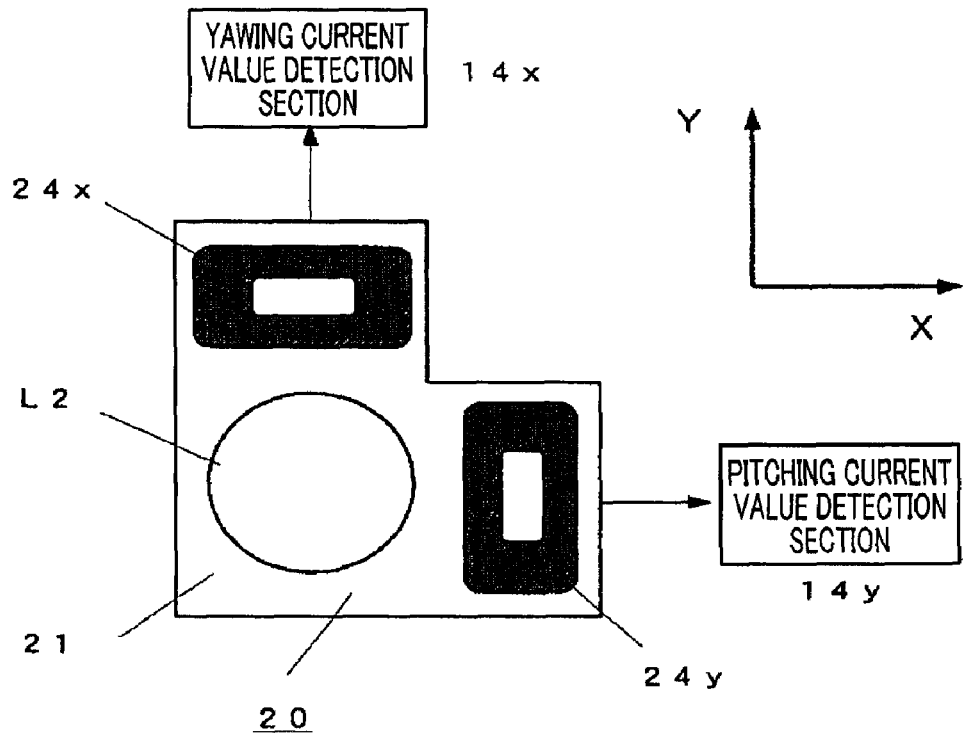

FIG. 15B shows the posture of image shake correction mechanism 20 in the vertical photographing posture rotated by 90 degrees from the horizontal photographing posture about the optical axis. The respective weights of second lens group L2, pitching holding frame 21, coils 24x and 24y, and yawing holding frame 22 act in the X direction which is the direction of gravitational force. In this case, second lens group L2 needs to be held to the center of the optical axis. This requires generation of an electromagnetic force to support the weight of yawing holding frame 22 in addition to the weight of second lens group L2 with respect to the X direction. Therefore, current value Ix1 is supplied to coil 24x to generate the required electromagnetic force. When the weight of yawing holding frame 22 is taken into account, current value Ix1 is a greater value than current value Iy1 supplied to coil 24y in the horizontal photographing posture. On the other hand, regarding the Y direction, since the weight to hold second lens group L2 to the center of the optical axis need not be taken into account, current value Iy2 supplied to coil 24y is a smaller value than current value Ix1 supplied to coil 24x.

As described above, the current values flowing through the coils 24x and 24y are determined by the photographing posture of digital camera 1. That is, the photographing posture of image shake correction mechanism 20 and digital camera 100 can be decided by detecting the current values flowing through the coils. Therefore, image shake correction mechanism 20 can be used not only to prevent image shake but also to function as a posture detection section for digital camera 1.

Figures 16, 17:
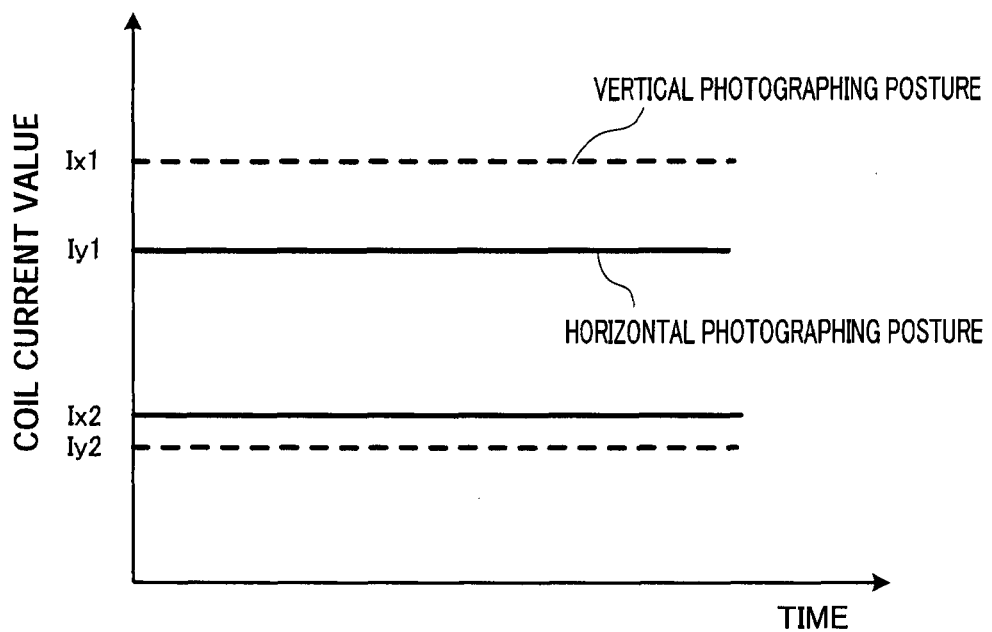
FIG. 16 shows an amount of current supplied to a coil for each photographing posture in Embodiment 2.
FIG. 17 shows a posture identifying signal for each photographing posture in Embodiment 2.

Next, the operation of digital camera 100 according to the present embodiment will be explained. FIG. 16 shows the amount of current supplied to a coil for each photographing posture and FIG. 17 shows a posture identifying signal for each photographing posture. Here, based on the posture of digital camera 1 in the horizontal photographing posture, suppose the angle at that time is 0 degree. Furthermore, the posture of digital camera in the vertical photographing posture is a posture rotated by 90 degrees from the horizontal photographing posture about the optical axis.

When the user photographs an image in the horizontal photographing posture, as shown in FIG. 16, yawing current value detection section 14x and pitching current value detection section 14y detect current value Ix2 that flows through coil 24x and current value Iy1 that flows through coil 24y of image shake correction mechanism 20 respectively. Microcomputer 3 identifies the posture of digital camera 1 as the horizontal photographing posture from the current value. When the user operates shutter operation section 36 in the horizontal photographing posture, an image is photographed and the image signal is recorded in image recording section 12. In this case, image recording control section 11 adds posture identifying signal 70(0) indicating that the photographing posture of digital camera 1 was the horizontal photographing posture (angle is 0 degree) to the image signal outputted from buffer memory 9. This posture identifying signal 70 is recorded, for example, in the header or in the footer section of the image signal. The timing at which posture identifying signal 70 is recorded may be determined in buffer memory 9 or image recording section 12.

On the other hand, when the user photographs an image in the vertical photographing posture, as shown in FIG. 16, yawing current value detection section 14x and pitching current value detection section 14y detect current value Ix1 that flows through coil 24x and current value Iy2 that flows through coil 24y of image shake correction mechanism 20. Microcomputer 3 identifies the posture of digital camera 1 as a vertical photographing posture from the current value. When the user operates shutter operation section 36 in the vertical photographing posture, photographing processing is performed and the image signal is recorded in image recording section 12. In this case, image recording control section 11 adds posture identifying signal 70(1) indicating that the photographing posture of digital camera 1 was a vertical photographing posture rotated by 90 degrees from the horizontal photographing posture about the optical axis to the image signal outputted from buffer memory 9. In this way, digital camera 100 according to the present embodiment records posture identifying signal 70 matching the posture taken when an image is photographed in association with the image signal.

Figure 18A:
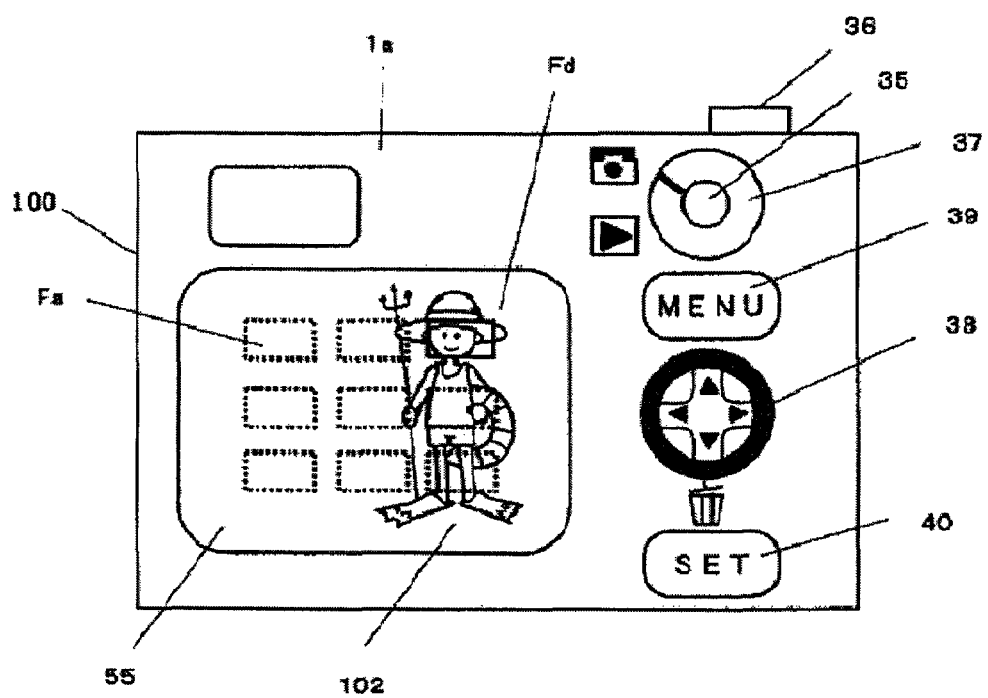
FIG. 18 shows display examples of the display section when an image is photographed according to Embodiment 2.
Figure 18B:
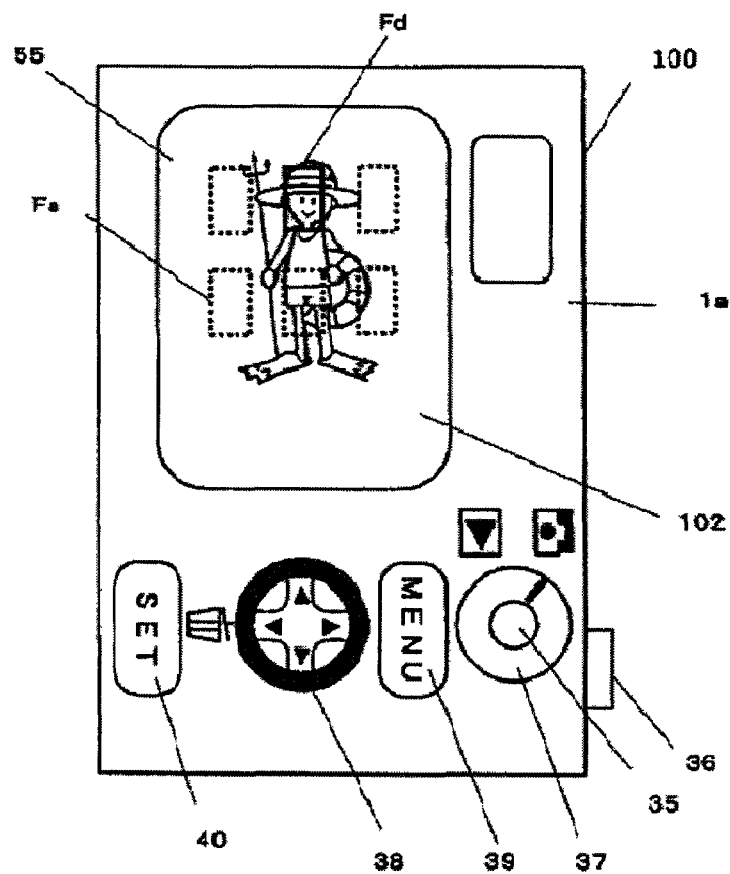

Furthermore, like Embodiment 1, a focus position identifying signal showing the focus position is added to the image signal. FIG. 18 shows a display example of display section 55 of when an image is photographed. Like Embodiment 1, AF control section 91 calculates an optimal focus position for the photographing object from the magnitude of the contrast value of each distance measuring area Fa and weight of distance measuring area Fa based on the arranged position and so on the photographing screen. When an image is photographed, for example, in the horizontal photographing posture as shown in FIG. 18A, focus area Fd is set in distance measuring area c and the focus position identifying signal indicative of distance measuring area c is added to the image signal. Furthermore, when an image is photographed, for example, in the vertical photographing posture shown in FIG. 18B, focus area Fd is set in distance measuring area d and the focus position on identifying signal indicative of distance measuring area d is added to the image signal. When an image is photographed in the vertical photographing posture, contrast values for six distance measuring areas out of the nine distance measuring areas are calculated to determine focus area Fd. Since in the vertical photographing posture, photographing is often performed in a composition including the photographing object and ground, this is intended to prevent focus area Fd from being set in the ground.

Figure 19A:
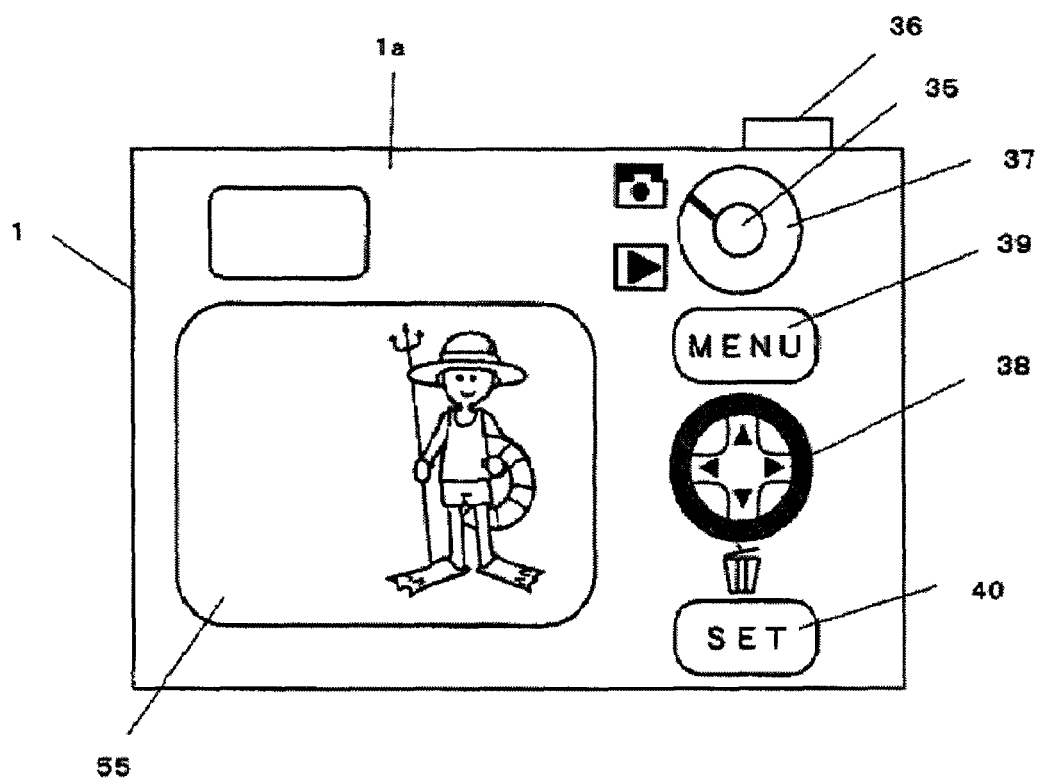
FIG. 19A shows an image photographed in a horizontal photographing posture and FIG. 19B shows an image photographed in a vertical photographing posture.
Figure 19B:
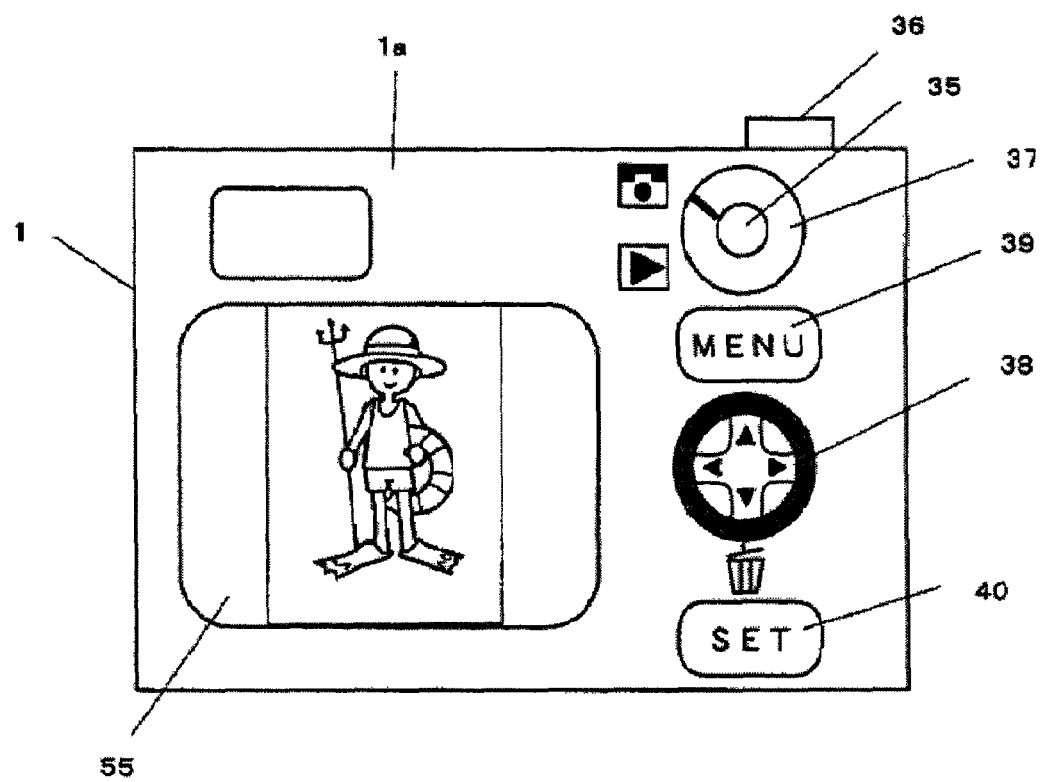

Next, display processing on a photographed image will be explained. FIG. 19 shows display examples of a photographed image. As described above, posture identifying signal 70 indicating the posture of digital camera 100 of when an image is photographed is added to the image signal in addition to the focus position identifying signal. In this way, image display control section 13 performs display processing matching posture identifying signal 70. That is, image display control section 13 displays an image photographed in a horizontal photographing posture on display section 55 as a horizontally oriented image. On the other hand, image display control section 13 displays an image photographed in a vertical photographing posture on display section 55 by rotating the posture of the photographed image by 90 degrees as a vertically oriented image. In this way, image display control section 13 displays an image with the vertical direction in the photographed image restored to the photographing posture when an image is photographed according to posture identifying signal 70 added to the image signal, and can thereby realize a display with good viewability.

Figure 20A:
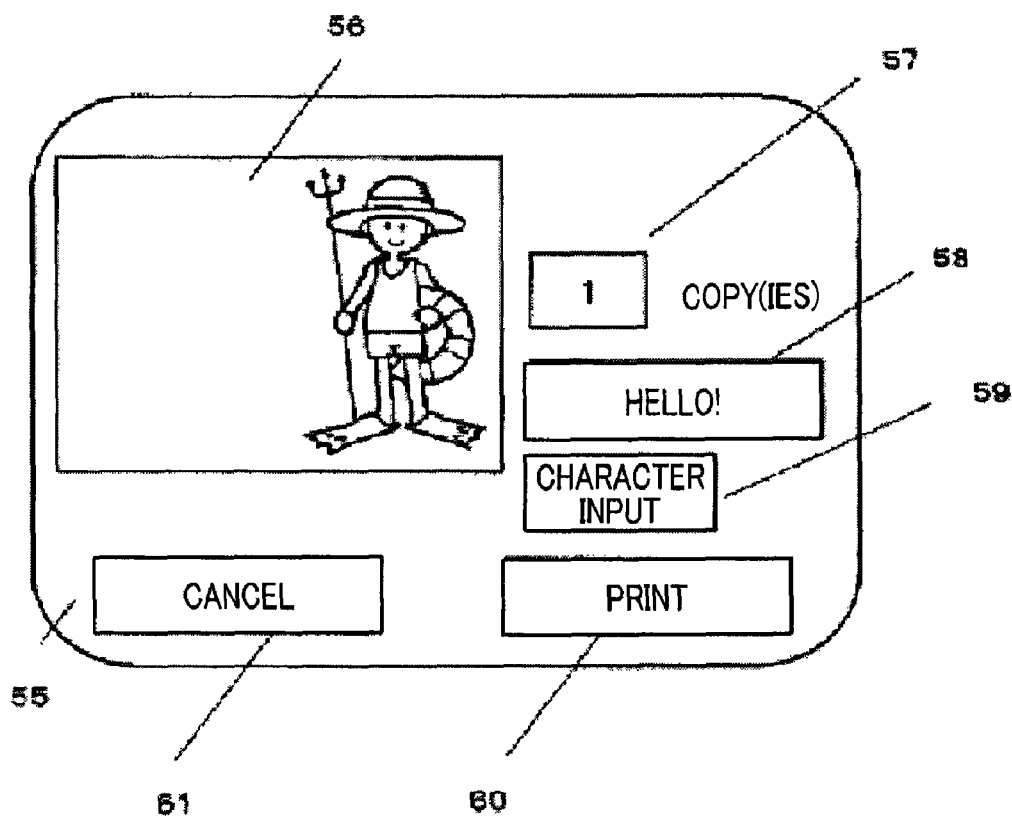
FIG. 20 shows an example of a print menu displayed on the display section in Embodiment 2.
Figure 20B:
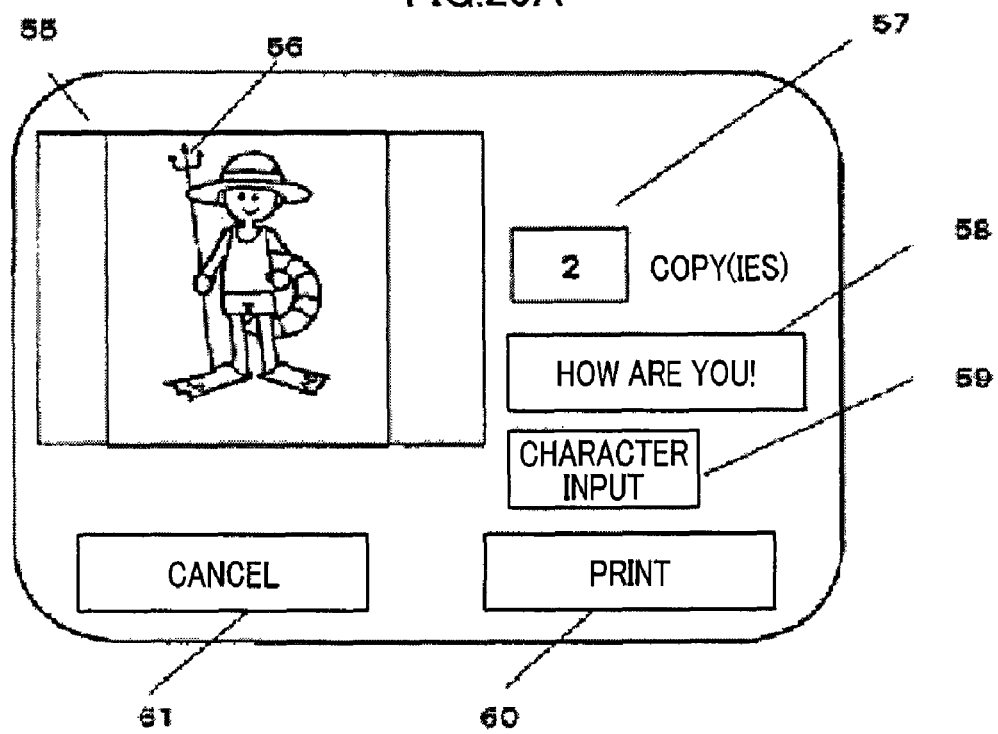

FIG. 20 shows an example of the print menu displayed on display section 55. The print menu shown in FIG. 20 is substantially the same as the print menu in Embodiment 1, but is different in that the photographed image is displayed with the vertical direction in the photographed image displayed on compressed image display section 56 restored to the posture of digital camera 100 when the image was photographed. Therefore, it is possible to display a photographed image with good viewability also in the print menu.

Figure 21:
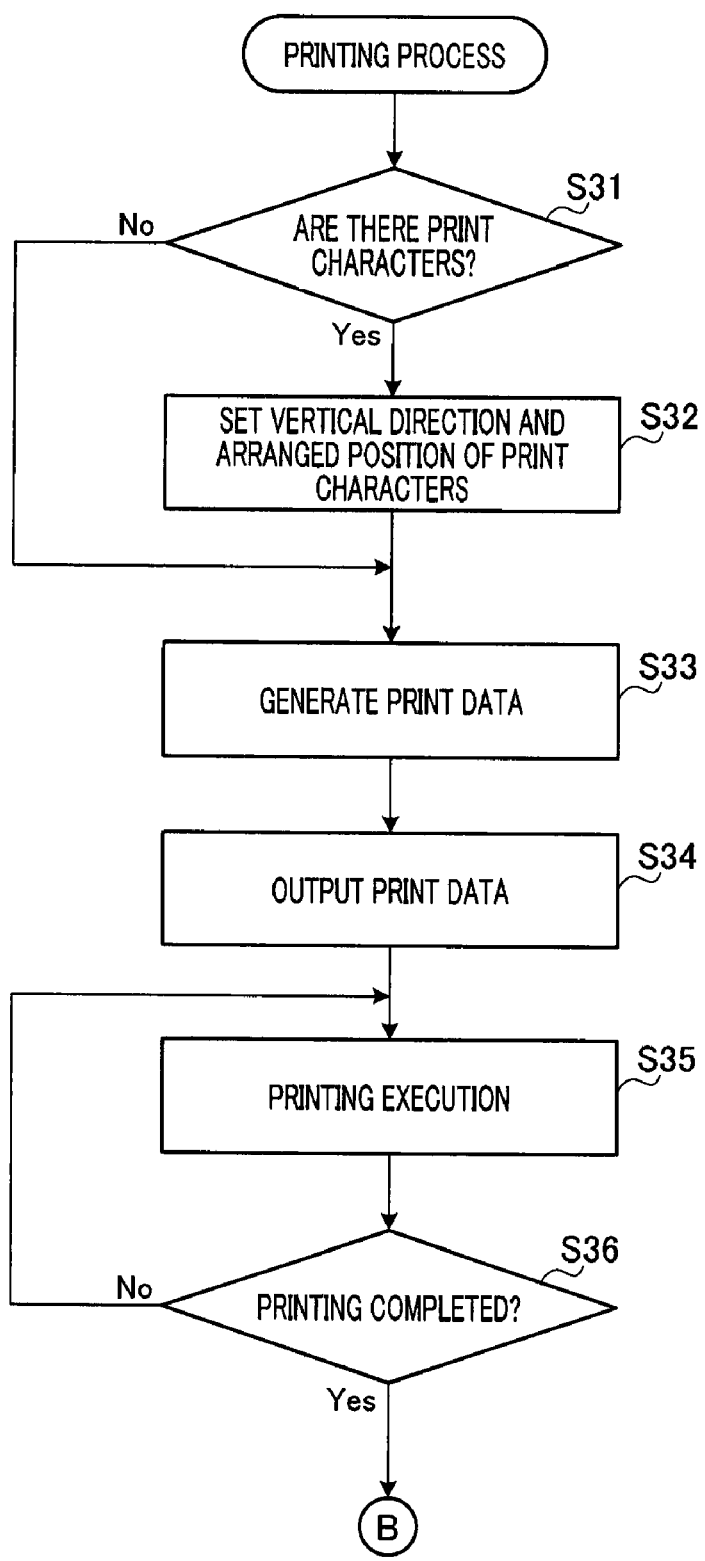
FIG. 21 is a flowchart of the process of printing out photographed images according to Embodiment 2.

FIG. 21 shows a flowchart of the process of printing out photographed images. The flowchart shown in FIG. 21 is substantially the same as that in FIG. 13, but is different in that the vertical direction of print characters can be further set.

Figure 22A:
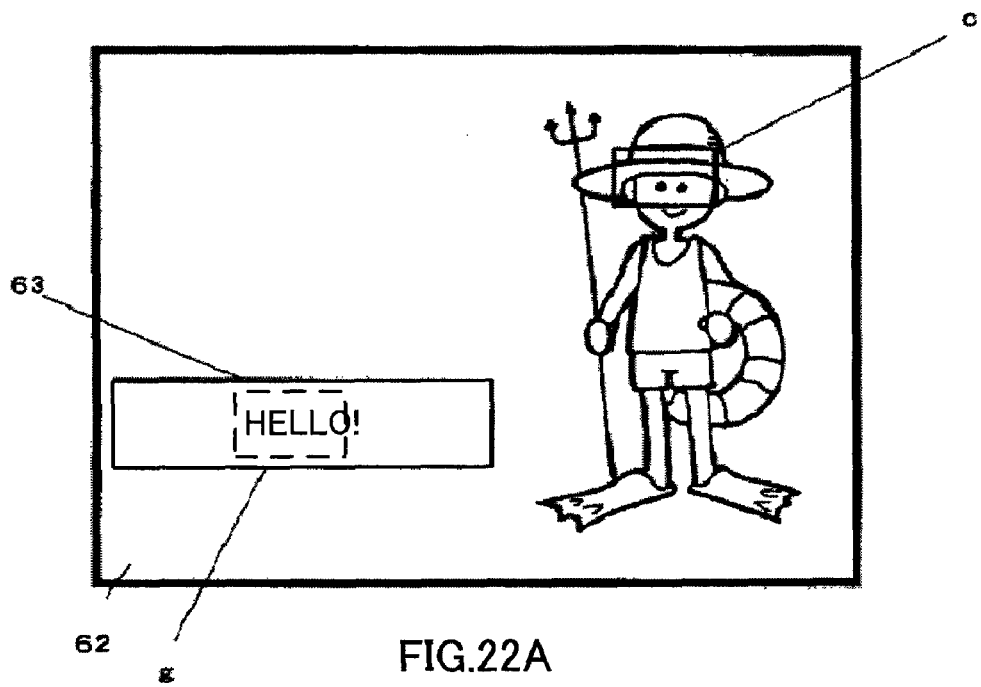
FIG. 22A shows a printing example of a horizontally oriented image and FIG. 22B shows a printing example of a vertically oriented image.
Figure 22B:
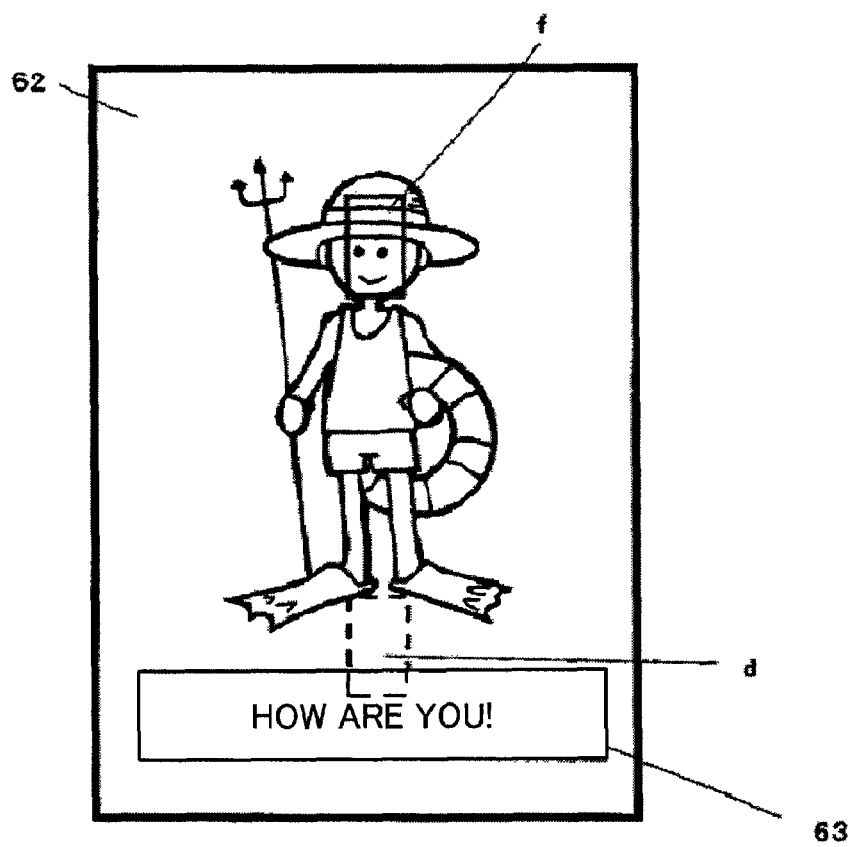

FIG. 22 is an example of a composite image printed out by printing apparatus 74. In FIG. 22, a distance measuring area is displayed with the composite image for purposes of illustration, but the distance measuring area is not displayed in the real printed image. FIG. 22A shows a printing example of horizontally oriented image and FIG. 22B shows a printing example of vertically oriented image. As shown in FIG. 22, print characters are arranged in a position outside the focus area of the photographed image in the same vertical direction as that of the photographed image and the composite image is printed on sheet 62. For example, since focus area Fd is distance measuring area c in FIG. 22A, print characters are arranged in distance measuring area g positioned on a diagonal line with respect to distance measuring area c. On the other hand, since focus area Fd is, for example, distance measuring area f in FIG. 22B, print characters are arranged in distance measuring area d.

As shown above, in addition to the effect of Embodiment 1, the digital camera according to the present embodiment arranges print characters in the same direction as the vertical direction in the photographed image, and can thereby print out a composite image with further improved viewability. Furthermore, the user needs not rotate the photographed image or print characters, and can thereby easily and efficiently print out a composite image and a high level of convenience is provided.

Furthermore, the digital camera according to the present embodiment can detect the photographing posture taken when an image is photographed through an image shake correction mechanism, and can thereby identify the photographing posture with a simple configuration without adding a new configuration.

Embodiment 3

Figure 23:
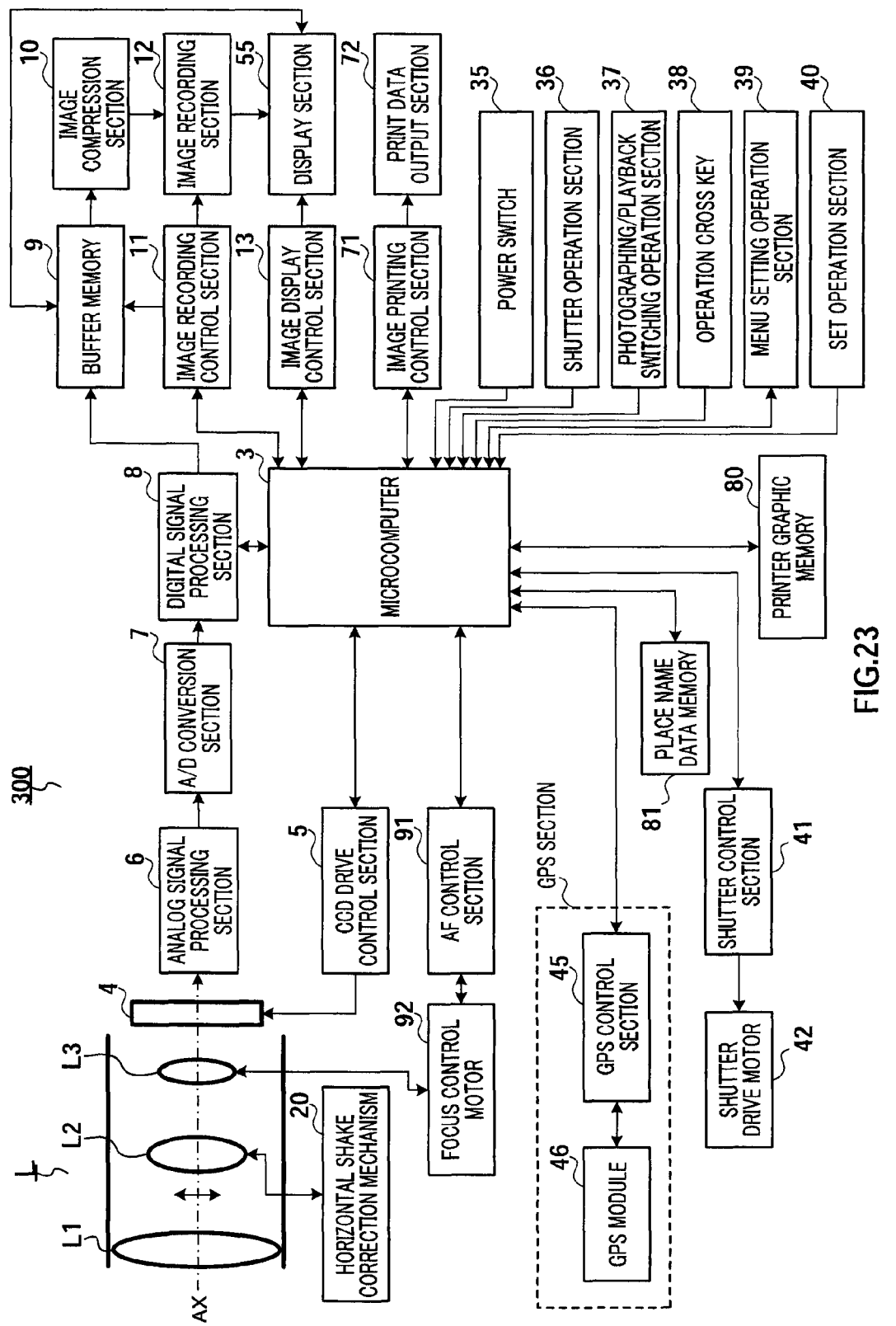
FIG. 23 is a block diagram showing a schematic configuration of a digital camera according to Embodiment 3.

FIG. 23 is a block diagram showing a schematic configuration of digital camera 300 according to Embodiment 3. Digital camera 300 has substantially the same configuration as that of digital camera 1 according to Embodiment 1 but is different in that a GPS (Global Positioning System) is further provided. The GPS includes GPS control section 45 and GPS module 46 and can identify a position on the earth using a signal from an artificial satellite. This allows location information obtained from the GPS to be displayed or printed with a photographed image. In the present embodiment, the same components as those in Embodiments 1 and 2 are assigned the same reference numerals and explanations will focus upon differences from Embodiments 1 and 2.

The GPS section is made up of GPS control section 45 and GPS module 46. GPS control section 45 controls the entire GPS section. In response to a command signal from GPS control section 45, GPS module 46 receives a signal from a satellite through a GPS antenna (not shown) and demodulates and decodes the received signal. GPS module 46 then calculates location information including latitudes, longitudes and altitudes based on the demodulated signal. Place name data memory 81 stores place name data that associates specific places such as municipal division names and city names with their latitudes and longitudes.

After the photographed image is recorded, microcomputer 3 sends a command to GPS control section 45 to acquire photographing location information matching the photographed image. GPS control section 45 which has received the command operates GPS module 46 and acquires location information. Microcomputer 3 searches for a place name matching the acquired location information from place name data memory 81 and stores the place name in an image file. Such location information is recorded in a header section or footer section of the image file. For example, when the photographed location is Okinawa, the header section or footer section of the image file records the place name of Okinawa based on the latitude and longitude acquired by the GPS section and place name data memory 81. When the place name matching the acquired latitude and longitude does not exist, the latitude and longitude may be recorded as location information or the most approximate place name among place names stored in place name data memory 81 may be recorded. In this way, digital camera 300 according to the present embodiment can record information about the photographed location with the photographed image.

Figure 24A:
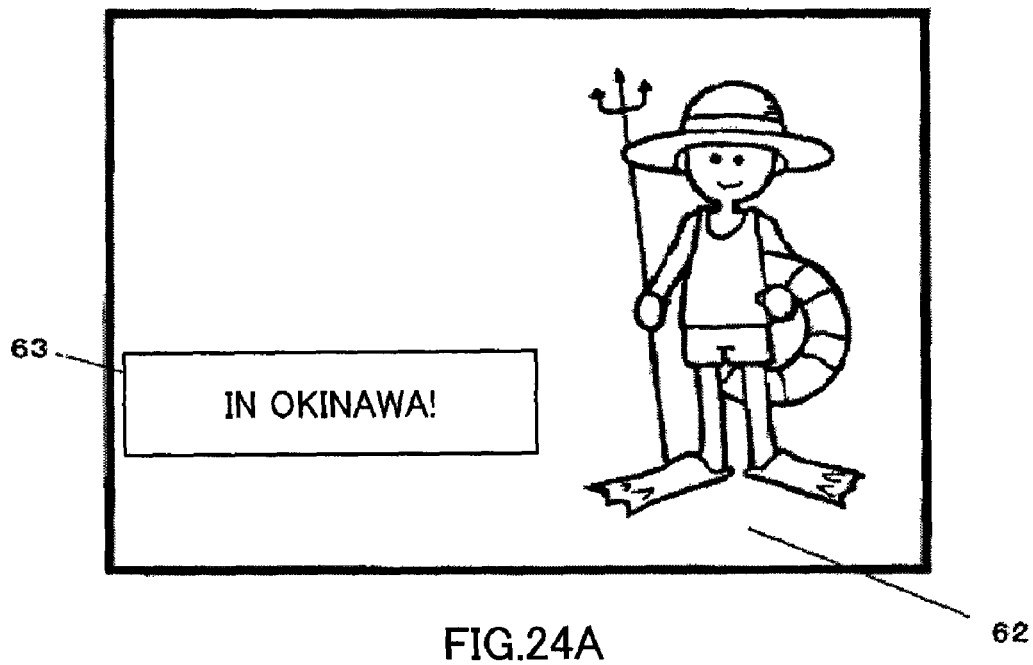
FIG. 24A shows a printing example of a horizontally oriented image and FIG. 24B shows a printing example of a vertically oriented image.
Figure 24B:
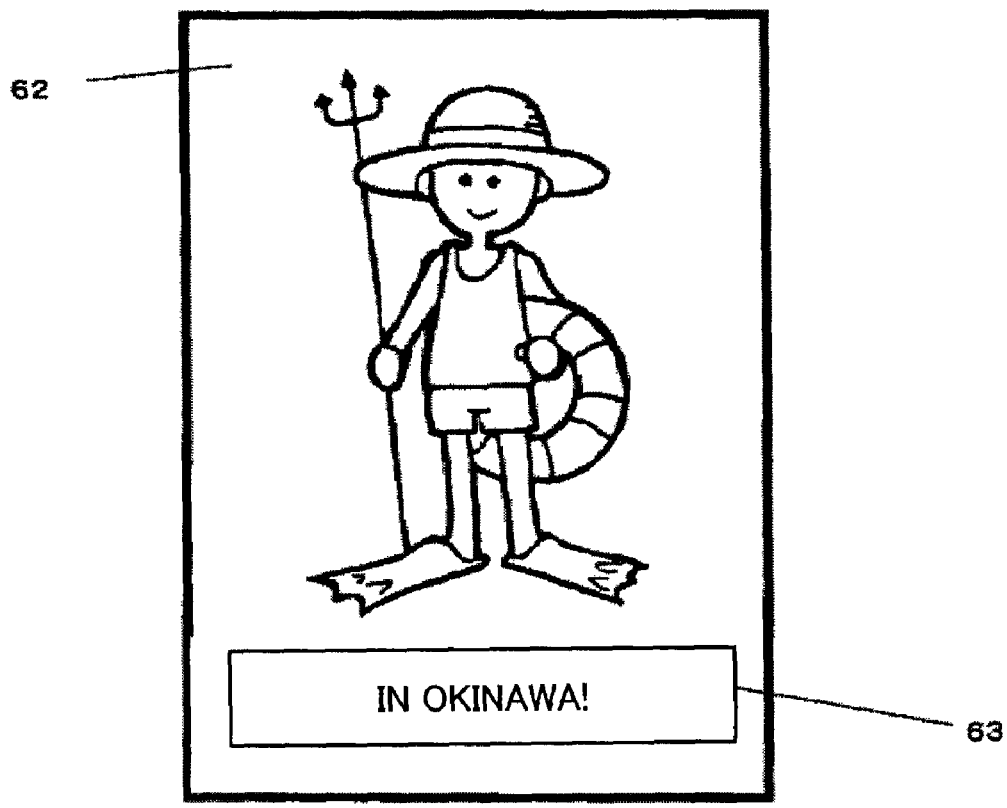

FIG. 24 shows an example of a composite image printed out by printing apparatus 74. The printing process according to the present embodiment is performed in substantially the same way as Embodiment 2, but is different in that a character string showing the place name or latitude and longitude is printed instead of print characters selected or inputted by the user in the print menu in FIG. 12. In this case, as shown in FIG. 22, the character string is arranged in a position that does not overlap the photographing object image in the same vertical direction as that of the photographed image. When, for example, the photographed location is Okinawa, "in Okinawa" is displayed as print characters.

As shown above, the digital camera according to Embodiment 3 is provided with the GPS section, and can thereby print out the character string showing the photographed location with the photographed image and a high added value is provided. Furthermore, since the character string showing the photographed location is arranged in consideration of the photographing object position on the photographing screen and the vertical direction in the photographed image, it is possible to print out a composite image with good viewability.

In the present embodiment, the digital camera searches for a place name corresponding to the latitude and longitude obtained by the GPS from a place name data memory, but the present invention is not limited to this. For example, an FM receiving section may be provided to search for a corresponding place name from place name data obtained through FM radio waves.

The present embodiment uses a place name or latitude and longitude as print characters instead of a character string selected or inputted by the user in the print menu, but the present invention is not limited to this. Both a character string selected or inputted in the print menu and place name or latitude and longitude may also be printed or displayed with the photographed image.

The digital camera according to Embodiments 1 to 3 is provided with the image printing control section, but the present invention is not limited to this. The image printing control section may also be provided on the printing apparatus. In such a case, the printing apparatus receives a photographed image, focus position identifying signal and posture identifying signal and so on from the digital camera and generates print data.

The digital camera according to Embodiments 1 to 3 is provided with a display section, but the present invention is not limited to this. The display section may also be provided in the printing apparatus. This can realize a digital camera in a simple configuration. Furthermore, the composite image and print menu may also be displayed on an external monitor connected to the digital camera.

The print characters in Embodiments 1 to 3 are arranged in positions outside a focus area, but the present invention is not limited to this. For example, print characters may also be arranged in positions where a brightness distribution is uniform such as blue sky. In such a case, the color of print characters may be made changeable depending on the background color. When, for example, the background color is blue, use of yellow which is the complementary color of blue for the color of print characters allows the print characters to be emphasized.

The digital camera according to Embodiments 1 to 3 prints and displays a still image, but the present invention is not limited to this. The present invention is also applicable to a case where a moving image is displayed. For example, it is possible to display a telop such as subtitles and comment in a position that does not overlap with an object image in a moving image and display the moving image with good viewability.

The digital camera according to Embodiments 1 to is configured to print out a composite image of an inputted character string and photographed image, but the present invention is not limited to this. For example, predetermined characters may also be directly inputted to the photographed image when the image is photographed.

The digital camera according to Embodiments 1 to 3 uses nine distance measuring areas to calculate an appropriate focus position, but the number of distance measuring areas is not limited to nine. For example, setting more distance measuring areas allows a more accurate focus position to be calculated. Furthermore, for example, setting fewer distance measuring areas can alleviate the load on signal processing and calculate the focus position more quickly.

The digital camera according to Embodiment 2 and Embodiment 3 may also record templates such as calendar in the recording section as an image beforehand and print or display a composite image of a template and a photographed image. The user needs not perform rotation processing to equalize the vertical direction in the photographed image with that of the template, and it is thereby possible to provide a digital camera with a high level of convenience.

When detecting a posture of the digital camera using the image shake correction mechanism in the digital camera according to Embodiment 2 and Embodiment 3, the current supplied to the coil in the yawing direction may be equal to the current supplied to the coil in the pitching direction depending on the posture of the digital camera. Examples of such a case may include a case where an image is photographed in a posture in which the optical axis direction of the digital camera is parallel to the direction of gravitational force and a case where in a posture in which the optical axis direction of the digital camera is orthogonal to the direction of gravitational force, an image is photographed with a predetermined range rotated about the optical axis. In this way, when the image shake correction apparatus cannot detect the posture, posture identifying signal 70(0) may be added to the image signal assuming that an image is photographed in a horizontal photographing posture. Alternatively, posture identifying signal 70(1) may be added assuming that an image is photographed in a vertical photographing posture.

The digital camera according to Embodiment 2 and Embodiment 3 decides the posture of the digital camera upon photographing an image by detecting current values of both the pitching and yawing current value detection sections, but the present invention is not limited to this. The posture of the digital camera upon photographing an image may also be identified by detecting a current value of at least one of the pitching and yawing current detection sections. However, as explained in the present embodiment, when an error occurs in one of the pitching and yawing current value detection sections, it is possible to decide the photographing posture more accurately by detecting both current values.

The digital camera according to Embodiment 2 and Embodiment 3 decides the posture of the digital camera upon photographing an image by detecting the current value of the pitching and yawing current value detection sections, but the present invention is not limited to this. For example, the posture of the digital camera may also be decided by measuring the voltage value.

The digital camera according to Embodiments 1 to 3 is connected to the printing apparatus using a USB cable, but the present invention is not limited to this. For example, the digital camera may also be connected using an IEEE1394 serial bus cable or by radio using a wireless LAN and so on. Furthermore, print data may also be recorded in a removable memory and printed out by a printing apparatus which can read the print data from the removable memory.

The digital camera according to Embodiment 2 and Embodiment 3 is provided with one shutter operation section, but the present invention is not limited to this. For example, the digital camera may also be mounted with a shutter operation section that performs photographing in a horizontal photographing posture and a shutter operation section that performs photographing in a vertical photographing posture individually and detect the operated shutter operation section and decide the posture of the digital camera.

Embodiment 2 and Embodiment 3 assume the horizontal photographing posture as 0 degree and the posture obtained by rotating this posture by 90 degrees about the optical axis as the vertical photographing posture, but the present invention is not limited to this. For example, if the horizontal photographing posture of the digital camera is assumed to be 0 degree, the posture obtained by rotating this posture by −90 degrees may also be decided to be the vertical photographing posture. Furthermore, when an image is photographed in the posture rotated by −90 degrees, posture identifying signal 70(2) may also be added to the image signal. This allows the digital camera to detect a total of three types of posture; one type of horizontal posture and two types of vertical posture.

The digital camera according to Embodiment 2 and Embodiment 3 uses a method of adding a signal of (0) or (1) as posture identifying signal 70, but the present invention is not limited to this. Furthermore, the digital camera may also manage a file which records photographed images in association with a file which records posture identifying signals, focus position identifying signals and print characters.

Embodiment 2 and Embodiment 3 have shown the example using a image shake correction mechanism as the posture detection section, but the present invention is not limited to this. For example, the posture of the digital camera may also be detected by attaching an angular sensor or rotation detection apparatus and so on to the digital camera.

Embodiments 1 to 3 adopt separate configurations for the digital camera and the printing apparatus, but the present invention is not limited to this. Similar effects can also be obtained by adopting an integral-type configuration with the digital camera including the printing apparatus.

In Embodiments 1 to 3, there can be any combinations among components included in the printing system. For example, it is also possible to adopt a system made up of a plurality of apparatuses in which an imaging optical system and imaging sensor, posture detection section and other components are physically separated, and the combinations among the respective components are not limited to this.

The digital camera according to Embodiments 1 to 3 is provided with the recording section that records a photographed image, but the present invention is not limited to this. For example, it is also possible to use a cradle provided with a hard disk, not requiring any cable for connections with the digital camera and capable of recording or integrating photographed images. Furthermore, the apparatus that controls the printing apparatus may also be, for example, a data storage provided with a hard disk and so on capable of storing a large amount of photographed images with no imaging optical system and such a data storage provided with a display section and an image printing control section allows use similar to that of a digital camera.

Embodiment 4

The present embodiment will explain a method of arranging character information after reading a photographed image recorded in a recording section with reference to FIG. 5, FIG. 6 and FIG. 12.

FIG. 5 is an excerpt of only main parts of the control block diagram of digital camera 1 shown in FIG. 3. FIG. 6 is a schematic configuration diagram of digital camera 1 and printing apparatus 74. As shown in FIG. 6, digital camera 1 and printing apparatus 74 are connected using USB cable 73. In FIG. 5, image printing control section 71 is controlled by a control signal from microcomputer 3 and generates print data to be transmitted to externally connected printing apparatus 74. Here, the print data includes, for example, a photographed image, character information to be printed out with the photographed image, and various types of data on printing such as arranged position and vertical direction of the character information, and the number of prints. Print data output section 72 outputs print data to the recording section of printing apparatus 74 via USB cable 73 based on a command of image printing control section 71. Printing apparatus 74 prints out a composite image of a photographed image and print characters on a sheet based on the transferred print data and printing command.

The user causes display section 55 to display the photographed image recorded in image recording section and selects an arbitrary photographed image. For example, the selected photographed image is an image displayed on compressed image display section 56 in FIG. 12. Here, when the user selects "one" in print number selection pull-down menu 57, selects "Hello!" in print character selection pull-down menu 58 and operates printing execution icon 60, character information is automatically arranged on the photographed image and printing out data is outputted to printing apparatus 74.

In this case, print data output section 72 is configured to include a reading section that reads an image signal from image recording section 12 and a face detection section that detects the face of the photographing object (including the face position) from the read image signal. When instructed by the user to print out the photographed image, print data output section 72 reads the image signal from image recording section 12, detects the face of the photographing object from the read image signal, arranges character information in a position different from that of the face on the photographing screen and generates print data the photographed image and character information. Print data output section 72 outputs the print data to printing apparatus 74. Printing apparatus 74 prints out a composite image of the photographed image and printer graphic on a sheet based on the print data from the print data output section. Microcomputer 3 may also control the recording section so as to record face position information showing the face position detected by the face detection section in association with the read image signal. In this case, print data output section 72 is further configured to include an output section that outputs the image signal and face position information to image recording section 12. Configured in this way, the recording section can record the face position information in association with the image signal recorded without being associated with the face position information. Furthermore, the face detection section may also be configured so as to be included in image recording control section 11. Configured in this way, image recording section 12 can record the face position information in association with the image signal obtained when an image is photographed.

Examples of the face detection method include a method of detecting contour information from the photographed image and detecting whether or not features (eyes, nose, mouth and so on) exist within the detected contour. When such features exist within the detected contour, the face detection section judges the detected part as the face. Print data output section 72 arranges character information in a position different from that of the contour part judged as the face. This allows the imaging apparatus to arrange the character information in a position other than the face.

Other Modification Examples

Figure 25:
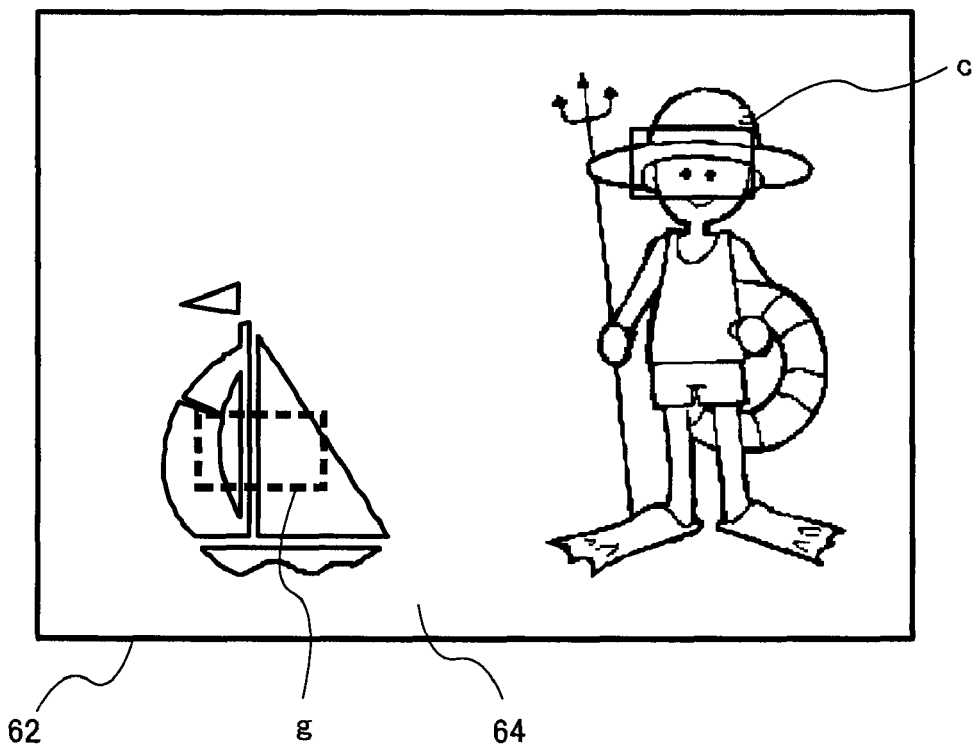
FIG. 25 shows an example of a composite image in a modification example applicable to Embodiments 1 to 4.

Furthermore, what is displayed or printed out with a photographed image is not limited to a character string, but may be a picture character, logo, watermark character and so on (hereinafter referred to as "picture character") 64. Furthermore, this picture character and so on 64 may also be adapted so that optimal picture characters and so on (e.g., picture character of yacht in the case of sea as shown in FIG. 25) may be automatically selected depending on the season or place in which the photographed image is recorded).

Figure 26:
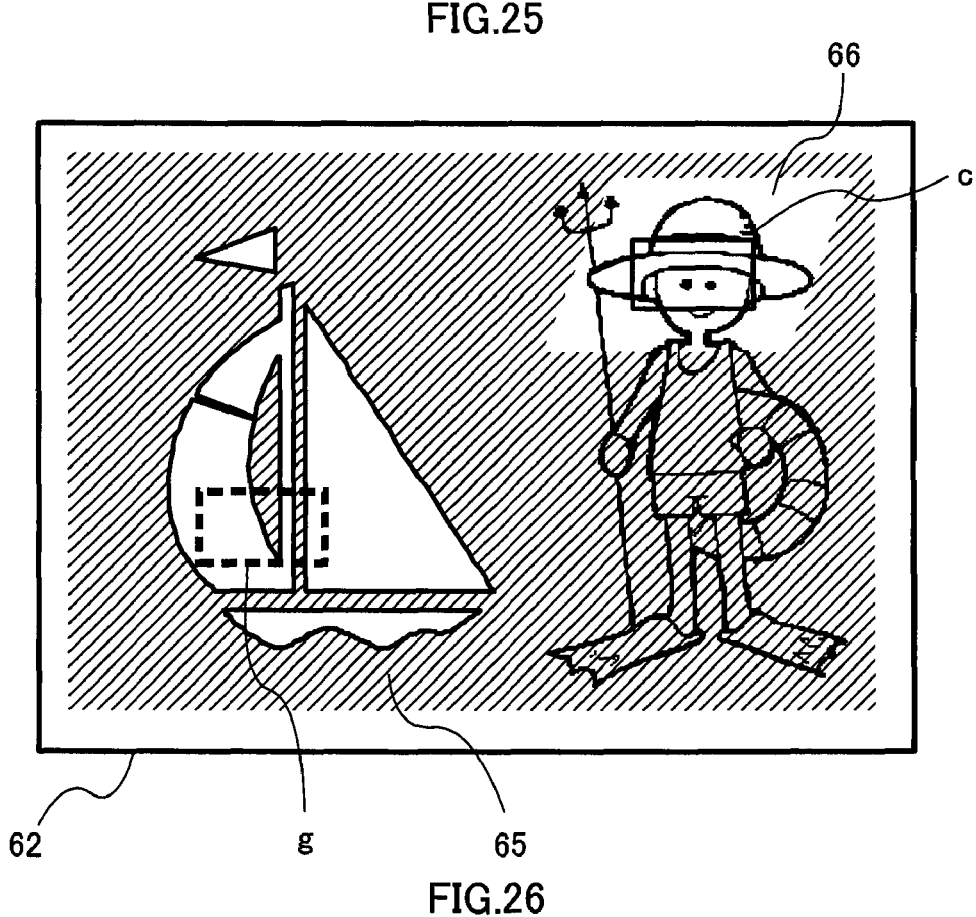
FIG. 26 shows another example of a composite image in a modification example applicable to Embodiments 1 to 4.

Furthermore, as shown in FIG. 26, what is displayed or printed out with the photographed image is not limited to a character string but may also be decoration frame 65. In this case, window frame 66 is provided at a focus position (position of the face) and decoration frame 65 is displayed or printed out at the other part. Furthermore, a plurality of window frames are provided in the case of a plurality of photographing objects. Window frame 66 may be automatically set in a predetermined size about the focus position.

Furthermore, as in the case of a portable telephone terminal with a camera function, an imaging apparatus may be provided with a transmitting apparatus so as to be able to transmit a photographed image in which picture characters and so on are synthesized. In this case, the file size of the photographed image may be automatically compressed so as to be able to shorten the transmission time and so on.

Various types of processing carried out on character information in above described Embodiments 1 to 4 are applicable to an image such as picture character.

One object of the present invention is attained by an imaging apparatus having the following configuration. An imaging apparatus that outputs an optical image of a photographing object as an electrical image signal and can transfer the image signal to a printing apparatus connected to the imaging apparatus, including an imaging optical system that forms an optical image of the photographing object, an imaging sensor that receives the formed optical image and converts the optical image to an electrical image signal, a focus position detection section that detects a focus position with respect to the photographing object, a recording section that records the image signal in association with focus position information showing the focus position, and a print data generation section that arranges character information including a character string in a position different from the focus position on a photographing screen based on the image signal and generates print data including the photographed image and the character information.

Another object of the present invention is attained by a printing system having the following configuration. A printing system in which an imaging apparatus and a printing apparatus are mutually connectable, the imaging apparatus including an imaging optical system that forms an optical image of a photographing object, an imaging sensor that receives the formed optical image and converts the optical image to an electrical image signal, a focus position detection section that detects a focus position with respect to the photographing object, a recording section that records the image signal in association with focus position information showing the focus position, a print data generation section that arranges character information including a character string in a position different from the focus position on the photographing screen and generates print data including the photographed image and the character information and a print data output section that outputs the gene rated print data, and the printing apparatus including a printing section that receives the outputted print data to perform printing.

A further object of the present invention is attained by a printing apparatus having the following configuration. A printing apparatus that can read an image signal and focus position information showing a focus position, including a reading section that reads the image signal and the focus position information, a print data generation section that arranges character information including a character string in a position different from the focus position on a photographing screen based on the image signal and generates print data including the photographed image and character information and a printing section that performs printing based on the generated print data.

A still further object of the present invention is attained by a printing method having the following configuration. A printing method using an imaging apparatus and a printing apparatus connected to each other, including a reading step of reading an image signal and focus position information showing a focus position, a print data generation step of arranging character information including a character string in a position different from the focus position on a photographing screen based on the image signal and generating print data including the photographed image and the character information and a printing step of performing printing based on the generated print data.

The disclosure of Japanese Patent Application No. 2006-043002, filed on Feb. 20, 2006, including the specification, drawings and abstract, is incorporated herein by reference in its entirety.

INDUSTRIAL APPLICABILITY

The imaging apparatus and printing apparatus according to the present invention relate to a method of printing out a photographed image and are applicable to a digital still camera, digital video camera, portable telephone terminal with a camera function and PDA required to provide comfortable printing and display.

The invention claimed is:

1. An imaging apparatus comprising:
    an imaging sensor that receives an optical image of a photographing object and converts the optical image to an electrical image signal;
    a focus position detection section that detects a focus position with respect to the photographing object on a photographing screen from the image signal;
    a control section that records the image signal in association with focus position information showing the detected focus position; and
    a print data generation section that arranges at least one of character information and an image in a position different from the focus position on the photographing screen and generates print data including a photographed image matching the image signal and the at least one of the character information and the image.

2. The imaging apparatus according to claim 1, wherein:
the focus position detection section comprises a focus area selection section that detects a state of focus in a plurality of distance measuring areas set on the photographing screen and selects at least one distance measuring area to focus upon amongst the plurality of distance measuring areas based on the detection results; and
the print data generation section arranges the at least one of the character information and the image in an area different from the selected distance measuring area on the photographing screen and generates the print data.

3. The imaging apparatus according to claim 1, further comprising:
a recording section that records at least one of, a plurality of pieces of character information and a plurality of images; and
an accepting section that accepts from a user a selection in the recorded at least one of the plurality of pieces of character information and the plurality of images,
wherein the print data generation section arranges the selected at least one of the character information and the image in a position different from the focus position on the photographing screen and generates the print data.

4. The imaging apparatus according to claim 1, further comprising an input section that receives as input at least one of character information and an image,
wherein the print data generation section arranges the inputted at least one of the character information and the image in a position different from the focus position on the photographing screen and generates the print data.

5. The imaging apparatus according to claim 1, further comprising a posture detection section that detects a posture of the imaging apparatus upon photographing, wherein:
the control section further records the image signal in association with posture information showing the detected posture; and
the print data generation section further arranges the at least one of the character information and the image in a same direction as a vertical direction in the photographed image based on the posture information and generates the print data.

6. The imaging apparatus according to claim 5, further comprising:
an imaging optical system that comprises a correction lens that moves in a direction orthogonal to an optical axis and forms the optical image of the photographing object; and
an image shake correction section that detects vibration added to the imaging apparatus and drives the correction lens,
wherein the posture detection section detects the posture of the imaging apparatus upon photographing based on a signal for driving the correction lens to move.

7. The imaging apparatus according to claim 6, wherein:
the image shake correction section comprises first and second actuators for driving the correction lens to move in two directions orthogonal to the optical axis; and
the posture detection section detects a posture of the imaging apparatus upon photographing based on a drive current for driving one or both of the first and second actuators.

8. The imaging apparatus according to claim 5, further comprising:
a display section that displays the photographed image and the at least one of the character information and the image; and
a display control section that arranges the at least one of the character information and the image in a position different from the focus position on the photographing screen in the same direction as the vertical direction in the photographed image based on the posture information and displays the at least one of the character information and the image on the display section.

9. The imaging apparatus according to claim 1, further comprising a position acquisition section that receives a signal from outside and acquires location information including one or both of latitude and longitude based on the signal,
wherein the character information comprises location information about a location of the imaging apparatus upon photographing.

10. The imaging apparatus according to claim 9, further comprising:
a place name data storage section that stores place name data in which the location information including one or both of the latitude and the longitude is associated with place name; and
a place name search section that searches for a place name matching the acquired location information about the location of the imaging apparatus upon photographing,
wherein the character information comprises the searched place name upon photographing.

11. A printing system in which an imaging apparatus and a printing apparatus are connected mutually, the imaging apparatus comprising:
an imaging sensor that receives an optical image of a photographing object and converts the optical image to an electrical image signal;
a focus position detection section that detects a focus position with respect to the photographing object on a photographing screen from the image signal;
a control section that records the image signal in association with focus position information showing the detected focus position;
a print data generation section that arranges at least one of character information and an image in a position different from the focus position on the photographing screen and generates print data including a photographed image matching the image signal and the at least one of the character information and the image; and
a print data output section that outputs the generated print data,
wherein the printing apparatus comprises a printing section that receives the outputted print data to perform printing.

12. The printing system according to claim 11, wherein:
the imaging apparatus further comprises a posture detection section that detects a posture of the imaging apparatus upon photographing;
the control section further records the image signal in association with posture information showing the detected posture; and
the print data generation section further arranges the at least one of the character information and the image in a same direction as the vertical direction in the photographed image based on the posture information and generates the print data.

13. The printing system according to claim 12, wherein the imaging apparatus further comprises:
a display section that displays the photographed image and the at least one of the character information and the image; and
a display control section that arranges the at least one of the character information and the image in a position different from the focus position on the photographing screen in the same direction as the vertical direction in the photographed image based on the posture information and displays the at least one of the character information and the image on the display section.

14. A printing apparatus comprising:
an acquisition section that acquires an image signal obtained by electrically converting an optical image of a photographing object and focus position information showing a focus position with respect to the photographing object on a photographing screen;
a print data generation section that arranges at least one of character information and an image in a position different from the focus position on the photographing screen and generates print data including a photographed image matching the image signal and the at least one of the character information and the image; and
a printing section that performs printing based on the generated print data.

15. A printing method comprising:
an acquisition step of acquiring an image signal obtained by electrically converting an optical image of a photographing object and focus position information showing a focus position with respect to the photographing object on a photographing screen;
a print data generation step of arranging at least one of character information and an image in a position different from the focus position on the photographing screen and generating print data including a photographed image matching the image signal and the at least one of the character information and the image; and
a printing step of performing printing based on the generated print data.

16. The printing method according to claim 15, wherein:
in the acquisition step, further, posture information showing a posture of the imaging apparatus upon photographing is acquired; and
in the print data generation step, further, the at least one of the character information and the image is arranged in a same direction as a vertical direction in the photographed image based on the posture information and the print data is generated.

17. An imaging apparatus comprising:
an imaging sensor that receives an optical image of a photographing object and converts the optical image to an electrical image signal;
a face position detection section that detects a position of a face of the photographing object on a photographing screen from the image signal or detects the position of the face of the photographing object on the photographing screen from an image signal read from a recording section;
a control section that records the image signal in association with face position information showing the detected position of the face; and
a print data generation section that arranges at least one of character information and an image in a position different from the position of the face on the photographing screen and generates print data including a photographed image matching the image signal and the one of the character information and the image.

18. The printing apparatus according to claim 14, wherein:
the acquisition section further acquires posture information showing a posture of the imaging apparatus upon photographing; and
the print data generation section, further, arranges the at least one of the character information and the image in a same direction as a vertical direction in the photographed image based on the posture information and generates the print data.

19. A display system in which an imaging apparatus and a display apparatus are connected mutually, the imaging apparatus comprising:
an imaging sensor that receives an optical image of a photographing object and converts the optical image to an electrical image signal;
a position detection section that detects, from the image signal, a focus position with respect to the photographing object on a photographing screen or a position of a face of the photographing object on the photographing screen, or detects the position of the face of the photographing object on the photographing screen from an image signal read from a recording section;
a control section that records the image signal in association with focus position information showing the detected focus position or face position information showing the detected face position;
a display data generation section that arranges at least one of character information and an image in a position different from the focus position or the face position on the photographing screen and generates display data including a photographed image matching the image signal and the at least one of the character information and the image; and
a display data output section that outputs the generated display data,
wherein the display apparatus receives the outputted display data to perform display.

20. The display system according to claim 19, wherein:
the imaging apparatus further comprises a posture detection section that detects a posture of the imaging apparatus upon photographing;
the control section further records the image signal in association with posture information showing the detected posture; and
the display data generation section further arranges the at least one of the character information and the image in a same direction as the vertical direction in the photographed image based on the posture information and generates the display data.

21. A display apparatus comprising:
an acquisition section that acquires an image signal obtained by electrically converting an optical image of a photographing object and focus position information showing a focus position with respect to the photographing object on a photographing screen;
a display data generation section that arranges at least one of character information and an image in a position different from the focus position on the photographing screen and generates display data including a photographed image matching the image signal and the at least one of the character information and the image; and
a display section that performs display based on the generated display data.

22. The display apparatus according to claim 21, wherein:
the acquisition section further acquires posture information showing a posture of the imaging apparatus upon photographing; and
the display data generation section, further, arranges the at least one of the character information and the image in a same direction as a vertical direction in the photographed image based on the posture information and generates the display data.

23. A display method comprising:
an acquisition step of acquiring an image signal obtained by electrically converting an optical image of a photographing object and focus position information showing a focus position with respect to the photographing object on a photographing screen;
a display data generation step of arranging at least one of character information and an image in a position different from the focus position on the photographing screen and generating display data including a photographed image matching the image signal and the at least one of the character information and the image; and
a display step of performing display based on the generated display data.

24. The display method according to claim 23, wherein:
in the acquisition step, further, posture information showing a posture of the imaging apparatus upon photographing is acquired; and
in the display data generation step, further, the at least one of the character information and the image is arranged in a same direction as a vertical direction in the photographed image based on the posture information and the display data is generated.

25. A display apparatus comprising:
an acquisition section that acquires an image signal obtained by electrically converting an optical image of a photographing object and face position information showing a face position of the photographing object on a photographing screen;
a display data generation section that arranges at least one of character information and an image in a position different from the face position on the photographing screen and generates display data including a photographed image matching the image signal and the at least one of the character information and the image; and
a display section that performs display based on the generated display data.

26. The display apparatus according to claim 25, wherein:
the acquisition section further acquires posture information showing a posture of the imaging apparatus upon photographing; and
the display data generation section, further, arranges the at least one of the character information and the image in a same direction as a vertical direction in the photographed image based on the posture information and generates the display data.

27. A display method comprising:
an acquisition step of acquiring an image signal obtained by electrically converting an optical image of a photographing object and face position information showing a face position of the photographing object on a photographing screen;
a display data generation step of arranging at least one of character information and an image in a position different from the face position on the photographing screen and generating display data including a photographed image matching the image signal and the at least one of the character information and the image; and
a display step of performing display based on the generated display data.

28. The display method according to claim 27, wherein:
in the acquisition step, further, posture information showing a posture of the imaging apparatus upon photographing is acquired; and
in the display data generation step, further, the at least one of the character information and the image is arranged in a same direction as a vertical direction in the photographed image based on the posture information and the display data is generated.

* * * * *